US011914908B2

(12) United States Patent
Wakasa et al.

(10) Patent No.: US 11,914,908 B2
(45) Date of Patent: Feb. 27, 2024

(54) PRINT MANAGEMENT SYSTEM AND PRINT MANAGEMENT METHOD

(71) Applicant: SEIKO EPSON CORPORATION, Tokyo (JP)

(72) Inventors: Takahiro Wakasa, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/190,167

(22) Filed: Mar. 27, 2023

(65) Prior Publication Data
US 2023/0315355 A1 Oct. 5, 2023

(30) Foreign Application Priority Data
Mar. 29, 2022 (JP) ................. 2022-053772

(51) Int. Cl.
*G06F 3/12* (2006.01)
(52) U.S. Cl.
CPC .......... *G06F 3/1219* (2013.01); *G06F 3/1235* (2013.01)
(58) Field of Classification Search
CPC ............ G06F 3/1219; G06F 3/1235
See application file for complete search history.

(56) References Cited

U.S. PATENT DOCUMENTS

| | | | | |
|---|---|---|---|---|
| 2009/0313145 | A1* | 12/2009 | Hamilton, II | G06F 3/1221 705/30 |
| 2012/0209783 | A1* | 8/2012 | Smith, Jr. | G06Q 20/384 705/308 |
| 2019/0156315 | A1* | 5/2019 | Nordbryhn | G06V 30/224 |
| 2019/0225439 | A1* | 7/2019 | Nakajima | B65H 3/44 |

FOREIGN PATENT DOCUMENTS

| | | |
|---|---|---|
| EP | 1 150 233 A1 | 10/2001 |
| EP | 3 654 273 A1 | 5/2020 |
| JP | 2020-088593 A | 6/2020 |

* cited by examiner

*Primary Examiner* — John R Wallace
(74) *Attorney, Agent, or Firm* — Global IP Counselors, LLP

(57) ABSTRACT

A print management system includes a printing apparatus, a first acquisition section that acquires print information indicating a print status, a second acquisition section that acquires collection information indicating a collection status of waste paper, and a provision instruction section that gives an instruction to provide a benefit to a user of the printing apparatus based on both the print information and the collection information.

9 Claims, 8 Drawing Sheets

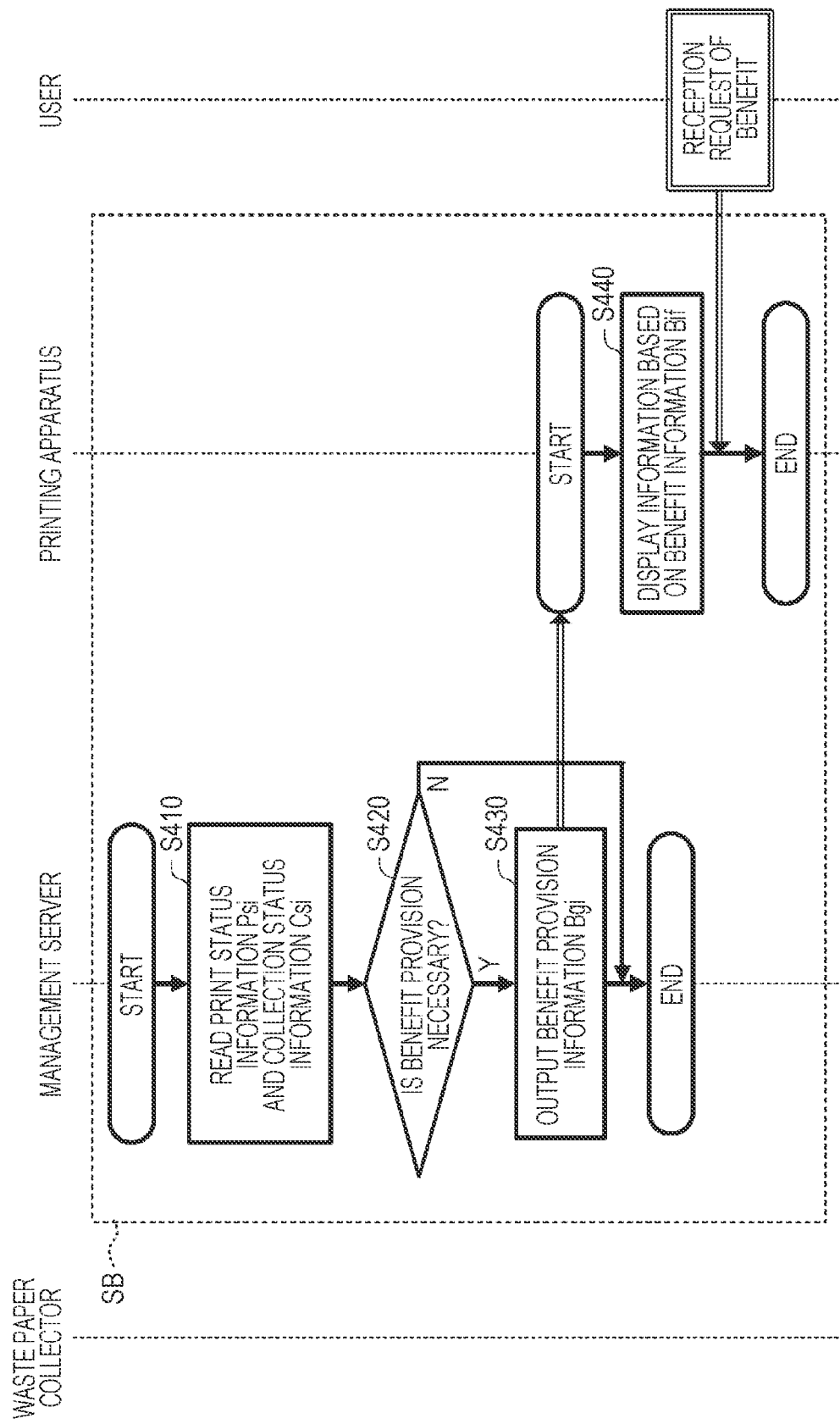

PRINT MANAGEMENT SYSTEM AND PRINT MANAGEMENT METHOD

The present application is based on, and claims priority from JP Application Serial Number 2022-053772, filed Mar. 29, 2022, the disclosure of which is hereby incorporated by reference herein in its entirety.

BACKGROUND

1. Technical Field

The present disclosure relates to a print management system and a print management method.

2. Related Art

In the related art, as a printing apparatus for forming a character or an image on paper, a printing apparatus capable of communicating via the Internet as disclosed in JP-A-2020-088593 is known.

In recent years, environmental protection has been increasingly required.

SUMMARY

According to an aspect of the present disclosure, there is provided a print management system including:
 a printing apparatus including a printing section that performs printing on recording paper;
 a first acquisition section that acquires print information indicating a print status of the printing section;
 a second acquisition section that acquires collection information indicating a collection status of waste paper; and
 a provision instruction section that gives an instruction to provide a benefit to a user of the printing apparatus based on both the print information and the collection information.

According to another aspect, there is provided a print management method including:
 a first acquisition step of acquiring print information indicating a print status in a printing section;
 a collection step of performing collection of waste paper;
 a second acquisition step of acquiring collection information indicating a collection status of the waste paper;
 a production step of producing recycled paper from the collected waste paper.
 a benefit provision step of providing a benefit based on the print information and the collection information.

BRIEF DESCRIPTION OF THE DRAWINGS

FIG. 4 is a diagram illustrating an operation example of the print management system.

DESCRIPTION OF EXEMPLARY EMBODIMENTS

Hereinafter, preferred embodiments of the present disclosure will be described with reference to the drawings. The drawings used are for convenience of explanation. It should be noted that the embodiments described below do not unduly limit the content of the present disclosure described in the scope of claims. In addition, not all of the configurations described below are essential constituent requirements of the present disclosure.

1. FIRST EMBODIMENT

1.1 Outline of Waste Paper Collection Using Print Management System

Figure 1:
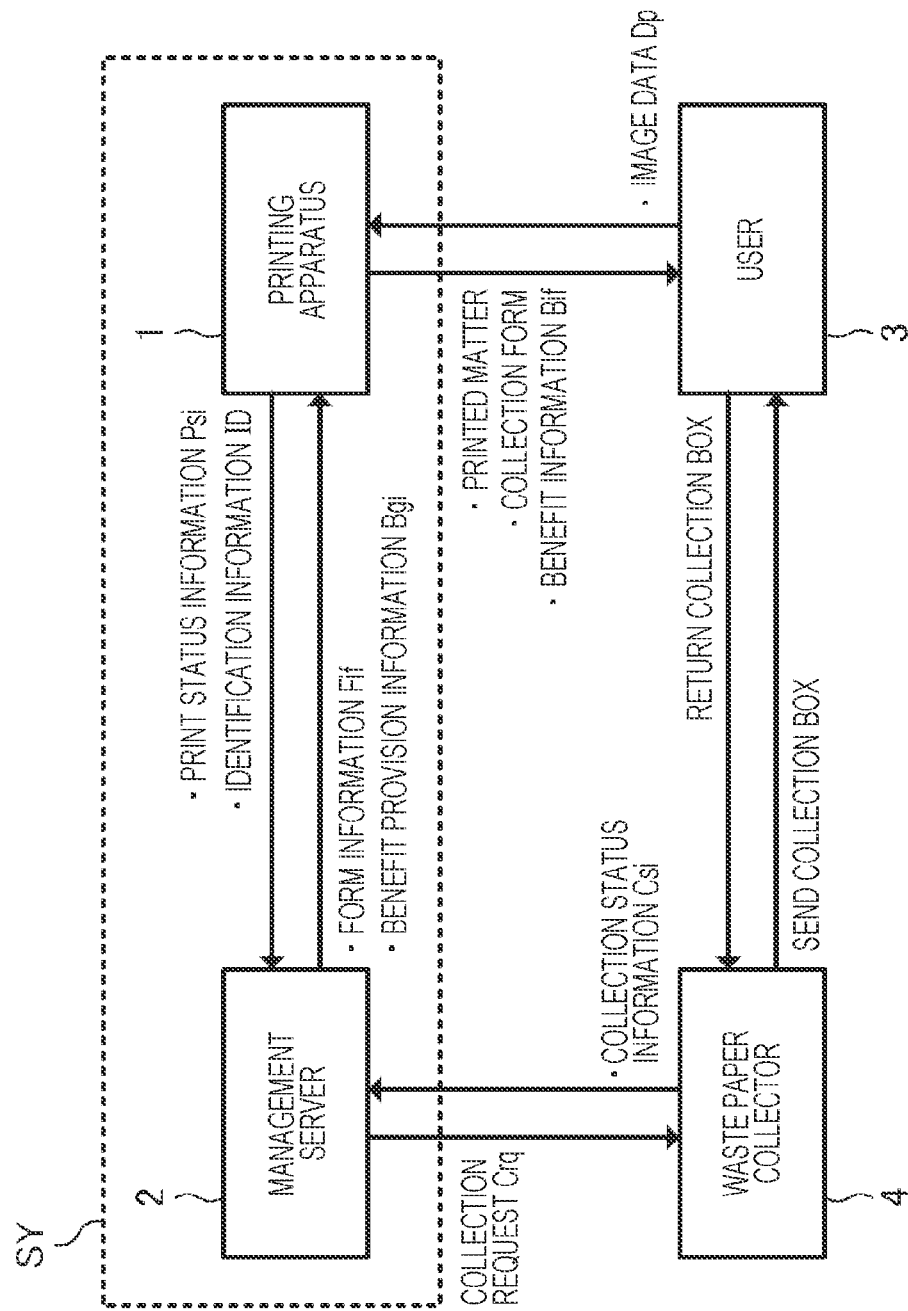
FIG. 1 is a diagram illustrating an outline of waste paper collection using a print management system.

FIG. 1 is a diagram illustrating an outline of waste paper collection using a print management system SY. As illustrated in FIG. 1, the print management system SY of a first embodiment includes a printing apparatus 1 and a management server 2. The printing apparatus 1 and the management server 2 are communicably connected to each other by using, for example, a signal line such as a LAN (Local Area Network) cable. In addition to the print management system SY, FIG. 1 illustrates a user 3 of the printing apparatus 1 and a waste paper collector 4 that collects used recording paper from the user 3 as waste paper. The printing apparatus 1 and the management server 2 may be communicably connected by wireless communication that does not use a signal line. Here, the waste paper is unnecessary paper, and includes, for example, paper whose intended use has ended after printing, paper which has failed in printing and is not used, or the like. In addition, the user 3 is not limited to a person that directly operates the printing apparatus 1, and includes a corporation or the like that causes an employee to perform the operation.

The printing apparatus 1 stores an identification information ID that specifies the user 3. The identification information ID is information for specifying the user 3 who uses the printing apparatus 1, and includes, for example, information such as the name, address, and contact information of the user 3. The identification information ID stored in the printing apparatus 1 is output to the management server 2.

Further, the printing apparatus 1 generates and outputs a printed matter by executing print processing on the recording paper based on the operation of the user 3. Specifically, image data Dp including information on characters and images formed on the recording paper by the operation of the user 3 is input to the printing apparatus 1. The printing apparatus 1 executes print processing of printing a character or an image corresponding to information included in the input image data Dp on a recording paper. Then, the printing apparatus 1 outputs the recording paper on which the print processing has been executed as a printed matter.

Here, the printing apparatus 1 only needs to be able to print the character or image corresponding to the information included in the image data Dp on the recording paper. For example, the printing apparatus 1 may be an ink jet printer that prints a desired character or image on the recording paper by landing ink on the recording paper or a laser printer that prints a desired character or image on a recording paper by fixing toner powder on the recording paper. Further, the printing apparatus 1 may be a multifunctional machine having a plurality of functions such as a scanning function for reading an image, a copy function for copying an image, and the like, in addition to a printing function for printing a character or an image on a recording paper.

As the print processing on the recording paper is executed, the printing apparatus 1 generates print status information Psi indicating an execution status of the print processing. The printing apparatus 1 holds the generated print status information Psi and outputs the held print status information Psi to the management server 2 at a predetermined timing.

The identification information ID output by the printing apparatus 1 and the print status information Psi are input to the management server 2. Further, collection status information Csi indicating a collection status of the waste paper collected from the user 3 by the waste paper collector 4 by the operation of the waste paper collector 4 and the identification information ID of the user 3 are input to the management server 2. Then, on the management server 2, the print status information Psi indicating the print status of the printing apparatus 1 and the collection status information Csi indicating the collection status of the waste paper are held in association with the identification information ID for specifying the user 3 of the printing apparatus 1.

The printing apparatus 1 prints a collection form including at least some of pieces of the information included in form information Fif input from the management server 2. As a result, the collection form is provided to the user 3. Here, when the form information Fif is input from the management server 2, the printing apparatus 1 may print the collection form without waiting for the instruction of the user 3. In addition, when the form information Fif is input from the management server 2, the printing apparatus 1 notifies the user 3 to print the collection form, and the printing apparatus 1 may print the collection form when the user 3 performs an operation to permit printing of the collection form in response to the notification. In the following description, when the form information Fif is input from the management server 2, the printing apparatus 1 notifies the user 3 to print the collection form, and the printing apparatus 1 prints the collection form when the user 3 performs an operation to permit printing of the collection form in response to the notification.

Here, the collection form printed by the printing apparatus 1 is a form used to move the waste paper from the user 3 to the waste paper collector 4. For example, the collection form is printed with a name, address, contact information, and the like for specifying the user 3, and the name, address, contact information, and the like of the waste paper collector 4. That is, the identification information ID such as a name, an address, and a contact information for specifying the user 3 are printed on the collection form. In addition to the above-described information, the collection form may be printed with various information related to the collection of waste paper, such as an amount and a type of waste paper requested to be collected by the user 3, a collection date and time, and the like. As such a collection form, for example, a collection form that conforms to the format of a delivery slip used when the waste paper is delivered from the user 3 to the waste paper collector 4 may be used.

The user 3 packs the waste paper in a collection box such as a cardboard box, attaches the collection form output by the printing apparatus 1, and sends the waste paper to the waste paper collector 4. As a result, the waste paper held by the user 3 is collected by the waste paper collector 4. The waste paper collector 4 produces recycled paper using the waste paper collected from the user 3, and inputs the collection status information Csi corresponding to the waste paper collected from the user 3 and the identification information ID printed on the collection form of the collected waste paper to the management server 2. As a result, since the user 3 and the collection status information Csi are associated with each other via the identification information ID, the collection status information Csi indicating the collection status of the waste paper from the user 3 held by the management server 2 is updated.

As described above, in the print management system SY of the first embodiment, the management server 2 determines whether or not the collection of the waste paper is necessary according to the print status of the printing apparatus 1. Then, when the management server 2 determines that it is preferable to collect the waste paper from the user 3, the management server 2 outputs the form information Fif to the printing apparatus 1, and the printing apparatus 1 prints the collection form corresponding to the form information Fif input from the management server 2. That is, the print management system SY of the first embodiment notifies the user 3 of a timing suitable for collecting the waste paper. Therefore, by promoting the user 3 to collect the waste paper and providing the user 3 with a collection form for collecting the waste paper, it is possible to reduce the labor required for the user 3 to collect the waste paper. As a result, a waste paper collection rate from the user 3 is improved, and as a result, effective utilization of resources can be further promoted.

Further, when the management server 2 determines that it is preferable to collect the waste paper from the user 3, the management server 2 may cause the waste paper collector 4 to send the collection box to the user 3. As a result, the user 3 is provided with the collection box for collecting the waste paper at a timing suitable for collecting the waste paper. That is, in the print management system SY of the first embodiment, the collection box for collecting waste paper and the collection form for sending the collection box to the waste paper collector 4 are provided to the user 3 at a timing suitable for collecting waste paper from the user 3. As a result, the labor required for the user 3 to collect the waste paper can be further reduced. As a result, the waste paper collection rate from the user 3 is further improved, and effective utilization of resources can be further promoted.

Further, since the waste paper collection rate from the user 3 increases, the waste paper collector 4 can continuously collect the waste paper with a small amount of labor. As a result, production efficiency of recycled paper based on the waste paper collected by the waste paper collector 4 is improved. That is, by causing the waste paper collector 4 to collect the waste paper and produce the recycled paper under the print management system SY of the first embodiment, the waste paper collection rate and the production efficiency of the recycled paper are improved, and further promotion of effective utilization of resources can be realized.

Further, the management server 2 determines whether or not to grant a benefit to the user 3 specified by the identification information ID based on the print status information Psi input from the printing apparatus 1 and the collection status information Csi input by the waste paper collector 4. Then, when the management server 2 determines that the benefit is granted to the user 3, the management server 2 generates benefit provision information Bgi for providing the benefit to the user 3 and outputs the benefit provision information Bgi to the printing apparatus 1. Specifically, the management server 2 calculates the waste paper collection rate for the user 3 from the collection status information Csi and the print status information Psi. Then, when the calculated waste paper collection rate is equal to or more than a predetermined value, the management server 2 determines that the user 3 is actively working on the collection of the waste paper, generates the benefit provision information Bgi for granting benefit to the user 3, and outputs the benefit provision information Bgi to the printing apparatus 1.

The printing apparatus 1 generates benefit information Bif including the content of the benefit defined by the input benefit provision information Bgi. Then, the printing apparatus 1 notifies the user 3 of the content of the benefit included in the benefit information Bif. As a result, the benefit defined by the benefit provision information Bgi is provided to the user 3. Specifically, when the management server 2 provides consumables such as recording paper used in the printing apparatus 1 as the benefit to the user 3, the management server 2 generates the benefit provision information Bgi including information on an exchange coupon that can be exchanged for the consumables such as the recording paper, and outputs the benefit provision information Bgi to the printing apparatus 1. The printing apparatus 1 prints the exchange coupon that can be exchanged for consumables such as recording paper included in the benefit provision information Bgi by the operation of the user 3 or at the timing when the benefit provision information Bgi is input. As a result, the consumables such as recording paper are provided to the user 3.

The benefit provided to the user 3 is not limited to the consumables such as the recording paper described above, and any benefit may be obtained directly or indirectly by the user 3. For example, when the user 3 pays a usage fee of the printing apparatus 1, a discount or the like of the usage fee may be provided as the benefit. In addition, an article unrelated to the printing apparatus 1 may be provided as the benefit.

In addition, the management server 2 calculates the amount of waste paper collected from the user 3 based on the collection status information Csi input by the waste paper collector 4, and when the calculated amount of waste paper collected is equal to or more than a predetermined value, the management server 2 may determine to grant the benefit to the user 3. Further, the management server 2 may determine whether or not to grant the benefit to the user 3 based on both the amount of waste paper collected from the user 3 and the waste paper collection rate of the user 3. Furthermore, by determining how much benefit is granted in a multi-stage, the greater the collection amount or the higher the collection rate, the greater the benefit may be provided.

In the print management system SY of the first embodiment as described above, the benefit is provided to the user 3 according to the collection status of the waste paper, so that the user 3 can raise the awareness of the waste paper collection. As a result, the amount of waste paper collected from the user 3 and the waste paper collection rate are further improved. As a result, it is possible to effectively utilize resources and further promote environmental protection.

1.2 Configuration of Print Management System

Figure 2:
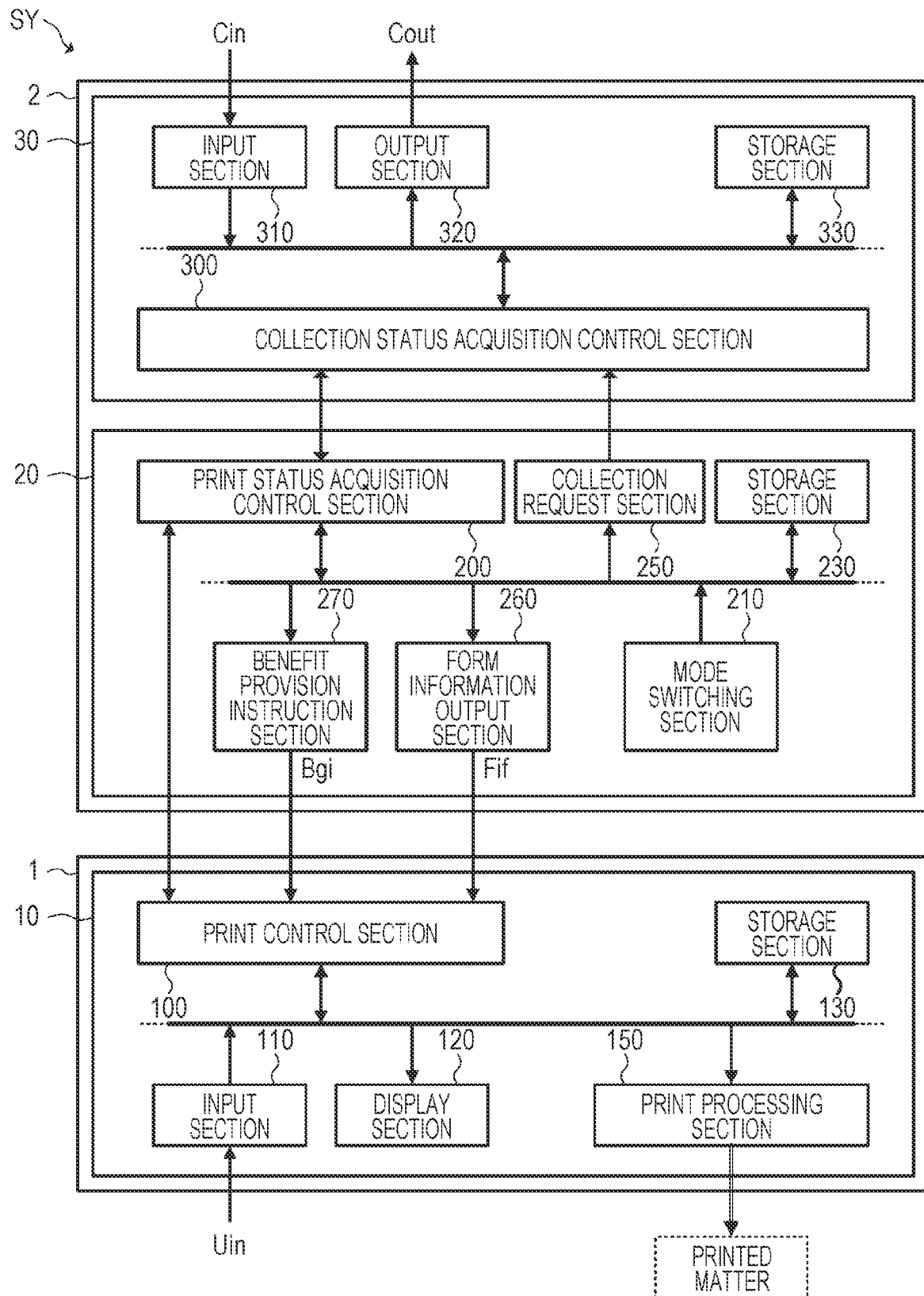
FIG. 2 is a diagram illustrating an example of a functional configuration of the print management system.

Next, a functional configuration of the print management system SY will be described. FIG. 2 is a diagram illustrating an example of the functional configuration of the print management system SY. As illustrated in FIG. 2, the print management system SY includes the printing apparatus 1 and the management server 2.

The printing apparatus 1 has a printing section 10. In addition, the printing section 10 includes a print control section 100, an input section 110, a display section 120, a storage section 130, and a print processing section 150. Then, the printing section 10 generates a printed matter by executing print processing of printing a desired character or image on the recording paper, and provides the printed matter to the user 3. That is, the printing apparatus 1 includes the printing section 10 that prints on the recording paper.

The input section 110 includes one or a plurality of switches that accept the operation of the user 3. Then, when the user 3 operates the input section 110, an input signal Uin including the image data Dp is input to the print control section 100. Here, considering that the input section 110 is configured to input the input signal Uin to the print control section 100, the input section 110 is not limited to a switch, and may be, for example, a connector to which a cable for communicably connecting the printing apparatus 1 and an external device is attached, an antenna used for wireless communication between the printing apparatus 1 and an external device, or a communication module for communicating between the printing apparatus 1 and an external device.

The print control section 100 controls the operation of various configurations included in the printing section 10. Such a print control section 100 includes one or a plurality of semiconductor devices including a processor.

When the image data Dp is input via the input section 110, the print control section 100 causes the print processing section 150 to execute print processing corresponding to the image data Dp. The print processing section 150 includes a transport unit (not illustrated) that transports the recording paper on which the print processing is executed, and a print head (not illustrated) that prints a character or an image corresponding to the image data Dp on the transported recording paper. The print control section 100 controls the transport of the recording paper in the transport unit and the printing of the characters and images on the recording paper in the print head based on the input image data Dp. As a result, the print processing section 150 executes the print processing according to the image data Dp.

In addition, the print control section 100 stores various information in the storage section 130 and reads out the information stored in the storage section 130.

Specifically, the print control section 100 stores the identification information ID in the storage section 130. That is, the storage section 130 stores information such as the name, address, and contact information of the user 3, which is the identification information ID for specifying the user 3 of the printing apparatus 1.

In addition, the print control section 100 generates print status information Psi indicating the status of the print processing executed by the print processing section 150. Then, the print control section 100 stores the generated print status information Psi in the storage section 130. That is, the storage section 130 stores the print status information Psi indicating the print status of the printing section 10.

Here, a specific example of the print status information Psi generated by the print control section 100 will be described. The print control section 100 generates the print status information Psi including information on the type and number of sheets of recording paper for which print processing has been executed by the print processing section 150 as one of the information indicating the print status of the printing section 10.

Specifically, the print control section 100 acquires, as information on the type of the recording paper, information on a size, a thickness, and the like of the recording paper on which the print processing section 150 executes the print processing, based on the information on the type of the recording paper to be printed, which is set in the printing apparatus 1, and acquires the number of sheets of the recording paper for which print processing has been executed by the print processing section 150.

Then, the print control section 100 associates the number of sheets of recording paper on which the print processing is executed with the information on the type of recording paper including the acquired size, thickness, and the like of the recording paper. As a result, the print control section 100 generates information on the type and number of sheets of recording paper for which print processing is executed by the print processing section 150, and specifically, generates the print status information Psi including the information including the number of sheets of recording paper for which the print processing associated with the information on the type of recording paper is executed.

In addition, the print status information Psi generates the print status information Psi including information on an error generated when the print processing section 150 executes the print processing, as one of the information indicating the print status of the printing section 10.

Specifically, the print control section 100 acquires information on a transport error and information on a print error from the print processing section 150, as the information on the error generated when the print processing section 150 executes the print processing. Here, the information on the transport error acquired by the print control section 100 is information including the number of sheets of recording paper in which an abnormality occurs when the transport unit transports the recording paper, and for example, information including the number of sheets of recording paper in which a so-called paper jam is generated, in which the recording paper is jammed inside the printing apparatus 1 when the transport unit transports the recording paper. Further, the information on the print error acquired by the print control section 100 is information including the number of sheets of recording paper in which an abnormality occurs when the print head prints a character or an image on the recording paper, and for example, information including the number of sheets of recording paper for which print quality has deteriorated due to a shortage of ink or toner when the print head prints a character or an image on the recording paper.

Then, the print control section 100 generates the print status information Psi including the error information including the acquired information on the transport error and information on the print error.

In addition, the print control section 100 generates the print status information Psi including information on whether or not the printed matter generated by the print processing of the print processing section 150 includes confidential information, as one of the information indicating the print status of the printing section 10.

Specifically, the print control section 100 analyzes the image data Dp input by the operation of the user 3 to determine whether or not a character indicating confidential information such as "company secret", "secret", and "confidential" is included in characters and images printed on the recording paper. Then, when the characters or images printed on the recording paper include characters indicating confidential information, the print control section 100 determines that the printed matter output based on the input image data Dp includes confidential information.

Further, in the case where the printing apparatus 1 is a multifunctional machine having a copy function of copying an original, the print control section 100 controls an image sensor (not illustrated) to read image information written on the original to be copied, and controls the print processing section 150 to print the read image information on recording paper. As a result, the printing apparatus 1 outputs a printed matter in which the original is copied. When determining whether or not confidential information is included in the printed matter output by such a copy function, the print control section 100 executes optical character recognition (OCR) processing on image information read by an image sensor (not illustrated). Then, the print control section 100 determines whether or not the characters or images acquired by the OCR processing include characters indicating confidential information such as "company secret", "secret", and "confidential".

Then, the print control section 100 generates the print status information Psi including information on the number of printed matters including characters indicating confidential information.

As described above, the print status information Psi includes the information on the type and number of sheets of recording paper for which the print processing is executed by the print processing section 150, the information on the error generated when the print processing section 150 executes print processing, and the information on whether or not the printed matter generated by the print processing of the print processing section 150 includes the confidential information, and the information on the transport error and the information on the print error generated when the print processing section 150 executes the print processing. Therefore, in the storage section 130, as the print status information Psi indicating the print status in the printing section 10, the information on the number of sheets to be printed for each type of recording paper on which printing has been performed, the information indicating the presence or absence of the transport error of the recording paper, the information indicating the presence or absence of the print error on the recording paper, and the information indicating whether or not the printed matter after the printing includes confidential information are stored, and the identification information ID for specifying the user 3 of the printing apparatus 1 is stored.

In addition to the above-described information, the print status information Psi stored in the storage section 130 may include information on the date and time when the printing apparatus 1 executes the print processing. Such a storage section 130 is composed of one or a plurality of semiconductor devices including a non-volatile memory. Here, a part or all of the storage section 130 may be included in the semiconductor device constituting the print control section 100.

In addition, the print control section 100 controls a display content on the display section 120. The display section 120 notifies the user 3 of various information related to the printing apparatus 1 and the print management system SY, such as information indicating an operating state of the printing apparatus 1, information accompanying an operation of the input section 110 by the user 3, and information input from the management server 2. As such a display section 120, for example, various display panels such as a liquid crystal display, an electronic luminescent (EL) display, and electronic paper can be used. Although the display section 120 and the input section 110 are illustrated as different configurations in FIG. 2, the display section 120 and the input section 110 may be an integrated configuration, for example, a touch panel or the like.

In addition, the print control section 100 is communicably connected to a print status acquisition control section 200, which will be described later, included in the management server 2.

The management server 2 has a print status acquisition section 20 and a collection status acquisition section 30. In addition, the collection status acquisition section 30 includes a collection status acquisition control section 300, an input section 310, an output section 320, and a storage section 330. Then, the collection status acquisition section 30 acquires the collection status information Csi indicating the collection status of the waste paper input by the waste paper collector 4.

The input section 310 includes one or a plurality of switches that accept the operation of the waste paper collector 4. Then, when the waste paper collector 4 operates the input section 310, the input signal Cin including the collection status information Csi indicating the collection status of the waste paper corresponding to the user 3 and the information for specifying the user 3 who has discharged the waste paper, for example, the identification information ID is input to the collection status acquisition control section 300 via the input section 310. That is, the collection status acquisition section 30 acquires the collection status information Csi along with the identification information ID.

Here, the information for specifying the user 3 who has discharged the waste paper, which is input to the collection status acquisition control section 300, is not limited to the identification information ID, and for example, may be information including some or all of pieces of the information included in the identification information ID or may be information including a specific management code corresponding to the identification information ID.

The collection status information Csi input to the collection status acquisition control section 300 is information indicating a collection status of waste paper and includes, for example, information on the amount of waste paper collected from the user 3 and information on foreign matter mixed in the waste paper collected from the user 3. Specifically, the collection status information Csi includes at least one of information on the number of sheets of the waste paper collected from the user 3, information on the number of collection boxes packed with waste paper collected from the user 3, and information on the weight of waste paper collected from the user 3 as information on the amount of waste paper collected from the user 3, and at least one of information on the type of foreign matter mixed in the collection box collected from the user 3, information on a cost required for processing the foreign matter, and information on a ratio of the weight of the mixed foreign matter to the total weight of the waste paper collected from the user 3 as information on foreign matter mixed in the waste paper collected from the user 3. In addition to the above-described information, the collection status information Csi may include information on the paper type of the waste paper collected from the user 3, information on the date and time when the waste paper is collected from the user 3, and the like.

Here, considering that the input section 310 to which the input signal Cin is input by the operation of the waste paper collector 4 inputs the input signal Cin to the collection status acquisition control section 300, the input section 310 is not limited to the switch, and for example, the input section 310 may be a connector to which a cable for communicably connecting the management server 2 and an external device such as a weight scale is attached or may be a communication module for communicating between the management server 2 and an external device.

The collection status acquisition control section 300 controls the operations of various configurations included in the collection status acquisition section 30. Such a collection status acquisition control section 300 includes one or a plurality of semiconductor devices including a processor.

The collection status acquisition control section 300 stores various types of information in the storage section 330 and reads the information stored in the storage section 330. Specifically, the identification information ID output by the printing section 10 is input to the collection status acquisition control section 300 via the print status acquisition section 20 described later. The collection status acquisition control section 300 stores the input identification information ID in the storage section 330. Further, the collection status information Csi and the information for specifying the user 3 who has discharged the waste paper are input to the collection status acquisition control section 300 via the input section 310. The collection status acquisition control section 300 specifies the identification information ID corresponding to the user 3 based on the information for specifying the user 3 who has discharged the input waste paper. Then, the collection status acquisition control section 300 stores the collection status information Csi in the storage section 330 in a state of being associated with the specified identification information ID.

Such a storage section 330 is configured with one or a plurality of semiconductor devices including a non-volatile memory. Here, a part or all of the storage section 330 may be included in the semiconductor device constituting the collection status acquisition control section 300.

In addition, the collection status acquisition control section 300 generates a collection request Crq requesting collection of waste paper from the user 3 under the control of the print status acquisition section 20 which will be described later. Then, the collection status acquisition control section 300 outputs an output signal Cout including the generated collection request Crq from the output section 320. As a result, the collection status acquisition control section 300 prompts the waste paper collector 4 to collect the waste paper from the user 3. Specifically, the output section 320 includes a display section such as a display panel, and the collection status acquisition control section 300 displays information corresponding to the collection request Crq requesting the display panel to collect the waste paper from the user 3 to promote the waste paper collector 4 to collect the waste paper from the user 3. Further, the output section 320 includes an e-mail transmission module, and the collection status acquisition control section 300 abolishes an e-mail including a collection request Crq requesting collection of waste paper from the user 3 via the e-mail transmission module. By transmitting to the waste paper collector 4, the waste paper collector 4 may be promoted to collect the waste paper.

In addition, the collection status acquisition control section 300 is communicably connected to the print status acquisition control section 200 which will be described later. Further, as described above, the print status acquisition control section 200 is communicably connected to the print control section 100. That is, the collection status acquisition control section 300 is communicably connected to the print status acquisition control section 200 and the print control section 100.

The print status acquisition section 20 includes the print status acquisition control section 200, a mode switching section 210, a storage section 230, a collection request section 250, a form information output section 260, and a benefit provision instruction section 270. Then, the print status acquisition section 20 acquires the print status information Psi indicating the print status of the printing section 10.

The print status acquisition control section 200 controls the operations of the mode switching section 210, the storage section 230, the collection request section 250, the form information output section 260, and the benefit provision instruction section 270 included in the print status acquisition section 20. Such a print status acquisition control section 200 includes, for example, one or a plurality of semiconductor devices such as a processor.

Specifically, the print status acquisition control section 200 outputs a switching control signal for controlling switching of the operation mode of the print management system SY in the mode switching section 210. The mode switching section 210 switches the operation mode of the print management system SY according to the input switching control signal between a first mode MD1 that collects the waste paper from the user 3 using the collection form, and a second mode MD2 that collects the waste paper from the user 3 without using the collection form. Further, the mode switching section 210 switches ON and OFF of a benefit provision mode MB for providing the benefit to the user 3 according to the input switching control signal.

Specifically, for example, when a contract condition regarding a waste paper collection method between the waste paper collector 4 and the user 3 is changed, the waste paper collector 4 inputs a switching request to switch the operation mode of the print management system SY via the input section 310. The switching request is input to the print status acquisition control section 200 via the collection status acquisition control section 300. Then, the print status acquisition control section 200 generates a switching control signal for switching the operation mode of the print management system SY to the first mode MD1 or the second mode MD2 in response to the input operation mode switching request and outputs the switching control signal to the mode switching section 210. As a result, the mode switching section 210 switches the operation mode of the print management system SY to the first mode MD1 or the second mode MD2.

Similarly, when the contract condition regarding the provision of the benefit between the waste paper collector 4 and the user 3 is changed, the waste paper collector 4 inputs a switching request for switching ON/OFF of the benefit provision mode MB via the input section 310. The switching request is input to the print status acquisition control section 200 via the collection status acquisition control section 300. Then, the print status acquisition control section 200 generates a switching control signal for switching ON/OFF of the benefit provision mode MB in the print management system SY according to the input operation mode switching request and outputs the switching control signal to the mode switching section 210. As a result, the mode switching section 210 switches ON/OFF of the benefit provision mode MB in the operation mode of the print management system SY.

In addition, the identification information ID output by the print control section 100 is input to the print status acquisition control section 200. The print status acquisition control section 200 stores the input identification information ID in the storage section 230 and outputs the identification information ID to the collection status acquisition control section 300.

In addition, the print status acquisition control section 200 acquires the print status information Psi stored in the storage section 130 of the printing section 10. Specifically, the print control section 100 outputs the print status information Psi to the print status acquisition control section 200 when the number of sheets of recording paper for which print processing has been executed by the print processing section 150 reaches a predetermined specified number of sheets. The print status acquisition control section 200 acquires and holds the input print status information Psi, and stores the input print status information Psi in the storage section 230 in association with an acquired acquisition timing.

Further, the print status acquisition control section 200 requests the collection status acquisition control section 300 to output the collection status information Csi at the timing when the print status information Psi output by the print control section 100 is acquired. The collection status acquisition control section 300 reads the collection status information Csi stored in the storage section 330 according to the request from the print status acquisition control section 200. Then, the collection status acquisition control section 300 outputs the read collection status information Csi to the print status acquisition control section 200. The print status acquisition control section 200 acquires and holds the input collection status information Csi, and stores the input collection status information Csi in the storage section 230 in association with the acquired acquisition timing.

After that, the print status acquisition control section 200 determines whether or not the waste paper collection from the user 3 is necessary based on the print status information Psi and the collection status information Csi. Specifically, the print status acquisition control section 200 calculates the waste paper collection rate of the user 3 based on the print status information Psi and the collection status information Csi stored in the storage section 230 and the collection status information Csi input from the collection status acquisition control section 300. Then, the print status acquisition control section 200 estimates the amount of waste paper held by the user 3 based on the calculated waste paper collection rate and the print status information Psi acquired from the print control section 100 and determines whether or not the waste paper collection from the user 3 is necessary based on the estimated amount of waste paper.

Here, the waste paper collection rate calculated by the print status acquisition control section 200 is, for example, may be a ratio of the amount of waste paper collected from the user 3 by the waste paper collector 4 to a calculation result obtained by subtracting the number of printed matters including the confidential information generated in the past in the printing apparatus 1 from the type and number of sheets of recording paper for which the print processing was executed in the past in the printing apparatus 1. Further, for example, the waste paper collection rate may be a ratio of the amount of waste paper collected from the user 3 by the waste paper collector 4 to a corrected calculation result obtained by correcting the calculation result, which is obtained by subtracting the number of printed matters including the confidential information generated in the past in the printing apparatus 1 from the type and number of sheets of recording paper for which the print processing was executed in the past in the printing apparatus 1, by a predetermined correction coefficient according to the intended use of the printed matter of the user 3. Of course, in any case, the number of printed matters including the confidential information may not be subtracted.

When the print status acquisition control section 200 determines that the collection of the waste paper from the user 3 is necessary, the print status acquisition control section 200 controls the operations of the form information output section 260 and the collection request section 250 according to the operation mode of the print management system SY selected by the mode switching section 210.

Specifically, when the mode switching section 210 selects the first mode MD1, in a case where the print status acquisition control section 200 determines that the collection of the waste paper from the user 3 is necessary, the print status acquisition control section 200 requests the form information output section 260 to output the form information Fif. As a result, the form information output section 260 outputs the form information Fif including the information for specifying the user 3 based on the identification information ID of the user 3.

The form information Fif output by the form information output section 260 is input to the print control section 100 of the printing section 10. The print control section 100 confirms with the user 3 whether or not the waste paper collection is necessary based on the input form information Fif. Specifically, the print control section 100 displays on the display section 120 information for confirming with the user 3 whether or not the collection of the waste paper is necessary based on the input form information Fif. Then, the user 3 executes an operation according to the display content of the display section 120. Accordingly, the print control section 100 determines whether or not the user 3 requests the collection of the waste paper.

When the print control section 100 determines that the user 3 requests the collection of the waste paper, the print control section 100 causes the print processing section 150 to execute the print processing of the collection form including the information included in the form information Fif. As a result, the user 3 acquires the collection form used for collecting the waste paper. Meanwhile, when the print control section 100 determines that the user 3 does not request the collection of the waste paper, the print control section 100 does not cause the print processing section 150 to execute the print processing of the collection form including the information included in the form information Fif. At this time, after a certain period of time has elapsed, the print control section 100 may display the information for confirming whether or not the collection of the waste paper is necessary based on the form information Fif on the display section 120 again.

As described above, the form information output section 260 outputs the form information Fif as a print request of the collection form to the printing section 10 based on the determination result of the print status acquisition control section 200, and the print control section 100 determines whether or not the waste paper collection with respect to the user 3 is necessary based on the form information Fif of the input collection form. Then, when the user 3 requests the collection of the waste paper by the operation of the input section 110, that is, when the printing of the collection form is permitted by the operation of the input section 110, the print processing section 150 executes the printing of the collection form including the information included in the form information Fif. Meanwhile, when the user 3 does not request the collection of the waste paper by the operation of the input section 110, that is, when the printing of the collection form is not permitted by the operation of the input section 110, the print processing section 150 does not execute the printing of the collection form. At this time, the form information output section 260 outputs the form information Fif as a print request for the collection form to the printing section 10 again. In other words, the print management system SY includes the input section 110 that permits the printing of the collection form, and when the print request of the collection form output by the form information output section 260 is permitted by the operation of the input section 110, the printing section 10 executes the printing of the collection form, and when the print request of the collection form output by the form information output section 260 is not permitted by the operation of the input section 110, the printing section 10 does not execute the printing of the collection form, and the form information output section 260 outputs the print request of the collection form to the printing section 10 again.

That is, the form information output section 260 prints the collection form based on the determination result of the print status acquisition control section 200. Specifically, when the print status acquisition control section 200 determines that the collection of the waste paper is necessary and the print request of the collection form output by the form information output section 260 is permitted by the operation of the input section 110, the form information output section 260 prints the collection form based on the determination result of the print status acquisition control section 200, and when the print status acquisition control section 200 determines that the collection of the waste paper is necessary and the print request of the collection form output by the form information output section 260 by the operation of the input section 110 is not permitted, the form information output section 260 does not print the collection form. Then, the form information output section 260 waits for permission of the print request of the collection form output by the form information output section 260 by the operation of the input section 110, and then prints the collection form.

Here, for example, the timing at which the form information output section 260 outputs the print request for the collection form to the printing section 10 again may be when printing of the collection form by operating the input section 110 is not permitted for a certain period of time after the form information output section 260 outputs the form information Fif as the print request for the collection form, or when printing of the collection form by operating the input section 110 is not permitted for a certain period of time after the form information output section 260 outputs the form information Fif as the print request of the collection form and when the print processing section 150 generates a predetermined number of printed matters.

After that, the user 3 fills the collection box with the waste paper, attaches a printed collection form, and sends the collection box to the waste paper collector 4. It can also be interpreted that the form information output section 260 causes the user 3 to send the waste paper.

Further, when the mode switching section 210 selects the first mode MD1, the waste paper collector 4 may send the collection box to the user 3. Specifically, when the print status acquisition control section 200 determines that the collection of the waste paper from the user 3 is necessary, the print status acquisition control section 200 requests the collection request section 250 to collect the waste paper using the collection form. The collection request section 250 generates collection request information requesting the collection of the waste paper using a collection form based on the request of the print status acquisition control section 200, and outputs the collection request information to the collection status acquisition control section 300. Then, the collection status acquisition control section 300 generates the collection request Crq for requesting the collection of the waste paper using the collection form based on the collection request information input from the collection request section 250. Then, the collection status acquisition control section 300 outputs the generated collection request Crq as the output signal Cout via the output section 320. As a result, the waste paper collector 4 is notified of the request for collecting the waste paper using the collection form.

The waste paper collector 4 grasps that the user 3 requests the collection of the waste paper using the collection form based on the collection request Crq. Then, the waste paper collector 4 sends the collection box to the user 3. The user 3 receives the collection box sent by the waste paper collector 4, packs the waste paper in the collection box, attaches the collection form, and returns the collection box to the waste paper collector 4. As a result, the waste paper held by the user 3 is collected by the waste paper collector 4. The waste paper collector 4 prints the collection form, and the waste paper collector 4 may send the collection box to which the collection form is attached to the user 3 so that the printing apparatus 1 does not print the collection form. Then, when the waste paper collector 4 receives the collection box, the waste paper collector 4 inputs the identification information ID included in the collection form into the input section 310, so that the print management system SY recognizes that the collection of the waste paper from the user 3 is performed.

When the mode switching section 210 selects the second mode MD2, and in a case where the print status acquisition control section 200 determines that the collection of the waste paper from the user 3 is necessary, the print status acquisition control section 200 does not request the form information output section 260 to output the form information Fif. That is, when the mode switching section 210 selects the second mode MD2, the print status acquisition control section 200 does not request the form information output section 260 to output the form information FiF regardless of the result of the determination as to whether or not the collection of the waste paper from the user 3 is necessary. In other words, the form information output section 260 does not output the print request for the collection form to the printing section 10 regardless of the determination result of the print status acquisition control section 200.

Further, when the mode switching section 210 selects the second mode MD2 and in a case where the print status acquisition control section 200 determines that the collection of the waste paper from the user 3 is necessary, the print status acquisition control section 200 requests the collection request section 250 to collect waste paper without using the collection form. The collection request section 250 generates the collection request information requesting collection of waste paper without using the collection form based on the request of the print status acquisition control section 200, and outputs the collection request information to the collection status acquisition control section 300. The collection status acquisition control section 300 generates the collection request Crq requesting the collection of the waste paper without using the collection form, based on the collection request information input from the collection request section 250. Then, the collection status acquisition control section 300 outputs the generated collection request Crq as the output signal Cout via the output section 320. As a result, the waste paper collector 4 is notified of the request for collecting the waste paper without using the collection form. The collection request Crq includes the identification information ID. That is, the collection request section 250 requests the collection of the waste paper with the identification information ID for specifying the user 3 of the printing apparatus 1.

The waste paper collector 4 grasps that the user 3 corresponding to the identification information ID requests the collection of the waste paper without using the collection form based on the collection request Crq. Therefore, the waste paper collector 4 does not send the collection box to the user 3, for example, goes directly to the user 3 and collects the waste paper held by the user 3. Then, when the waste paper collector 4 collects the waste paper, the waste paper collector 4 inputs the identification information ID included in the collection request Crq into the input section 310, so that the print management system SY recognizes that the collection of the waste paper from the user 3 is performed.

As described above, the print management system SY in the present embodiment has, as operation modes, the first mode MD1 for collecting the waste paper using the collection form and the second mode MD2 for collecting the waste paper without using the collection form. As a result, the waste paper can be collected at the convenience of the user 3, and the convenience of the user 3 who uses the printing apparatus 1 and the print management system SY can be improved.

When the mode switching section 210 selects ON of the benefit provision mode MB, the print status acquisition control section 200 determines whether or not to grant the benefit to the user 3 based on at least one of the collection status information Csi and the print status information Psi stored in the storage section 230. Then, when it is determined that the print status acquisition control section 200 provides the benefit to the user 3, the print status acquisition control section 200 instructs the benefit provision instruction section 270 to perform benefit provision processing. In the benefit provision processing, the benefit provision instruction section 270 generates benefit provision information Bgi including information on the benefit to be provided to the user 3 in accordance with the request of the print status acquisition control section 200, and outputs the benefit provision information Bgi to the print control section 100.

The print control section 100 generates the benefit information Bif indicating information on the benefit to be provided to the user 3 based on the information on the benefit to be provided and included in the benefit provision information Bgi to be input. Then, the print control section 100 controls the display section 120 to display the content of the benefit indicated by the benefit information Bif on the display section 120. In other words, the display section 120 notifies the user 3 of the benefit provision defined by the benefit information Bif. The benefit provision instruction section 270 may notify the user 3 by other means, such as describing the content of the benefit in an e-mail transmitted to the user 3.

At the same time, the benefit provision instruction section 270 gives an instruction to provide the benefit. Specifically, for example, the benefit provision instruction section 270 instructs a coupon ticket issuing system to issue a coupon ticket to the user 3 as an instruction to provide the benefit. Alternatively, the benefit provision instruction section 270 may instruct a cost billing system to discount the cost of the user 3 as an instruction for providing benefit. Alternatively, the instruction of providing benefits may be given by a method other than this.

That is, the print status acquisition control section 200 determines whether or not to grant the benefit to the user 3 based on at least one of the collection status information Csi and the print status information Psi. Then, when the benefit is provided, the benefit provision instruction section 270 outputs the benefit provision information Bgi instructing the user 3 to grant the benefit based on at least one of the collection status information Csi and the print status information Psi.

Here, an example of a determination condition of whether or not the print status acquisition control section 200 provides a benefit to the user 3 in the benefit provision mode MB will be described.

For example, in the benefit provision mode MB, the print status acquisition control section 200 reads the collection status information Csi and the print status information Psi stored in the storage section 230. Then, the print status acquisition control section 200 calculates the waste paper collection rate for the user 3 from the read collection status information Csi and print status information Psi. The print status acquisition control section 200 may instruct the benefit provision instruction section 270 to generate the benefit provision information Bgi for granting the benefit to the user 3 when the waste paper collection rate of the user 3 in a predetermined period is equal to or more than a predetermined value. That is, the benefit provision instruction section 270 may give an instruction to provide a benefit to the user 3 based on the waste paper collection rate.

Further, in the benefit provision mode MB, the print status acquisition control section 200 reads the collection status information Csi stored in the storage section 230. Then, the print status acquisition control section 200 calculates the amount of waste paper collected from the user 3 within a predetermined period from the read collection status information Csi. When the collection amount of waste paper collected from the user 3 in a predetermined period is equal to or more than a predetermined value, the print status acquisition control section 200 may instruct the benefit provision instruction section 270 to generate the benefit provision information Bgi for granting the benefit to the user 3. That is, the benefit provision instruction section 270 may give instruction to provide a benefit to the user 3 based on the amount of waste paper collected from the user 3.

Further, the print status acquisition control section 200 may consider a quality of the waste paper collected from the user 3 within a predetermined period as a condition for determining whether or not to provide the benefit to the user 3. The quality of the waste paper is, for example, a state of foreign matter such as a foreign matter mixing rate included in the collection status information Csi stored in the storage section 230. Then, the print status acquisition control section 200 adds the read foreign matter mixing rate to the waste paper collection rate of the user 3 in the predetermined period and the collection amount of the waste paper of the user 3 in the predetermined period to determine whether or not to grant the benefit to the user 3. That is, the benefit provision instruction section 270 may give an instruction to provide a benefit to the user 3 when the foreign matter mixing rate mixed in the waste paper is relatively small, and may not provide the benefit to the user 3 when the foreign matter mixing rate is relatively high.

1.3 Operation of Print Management System

Figure 3A:
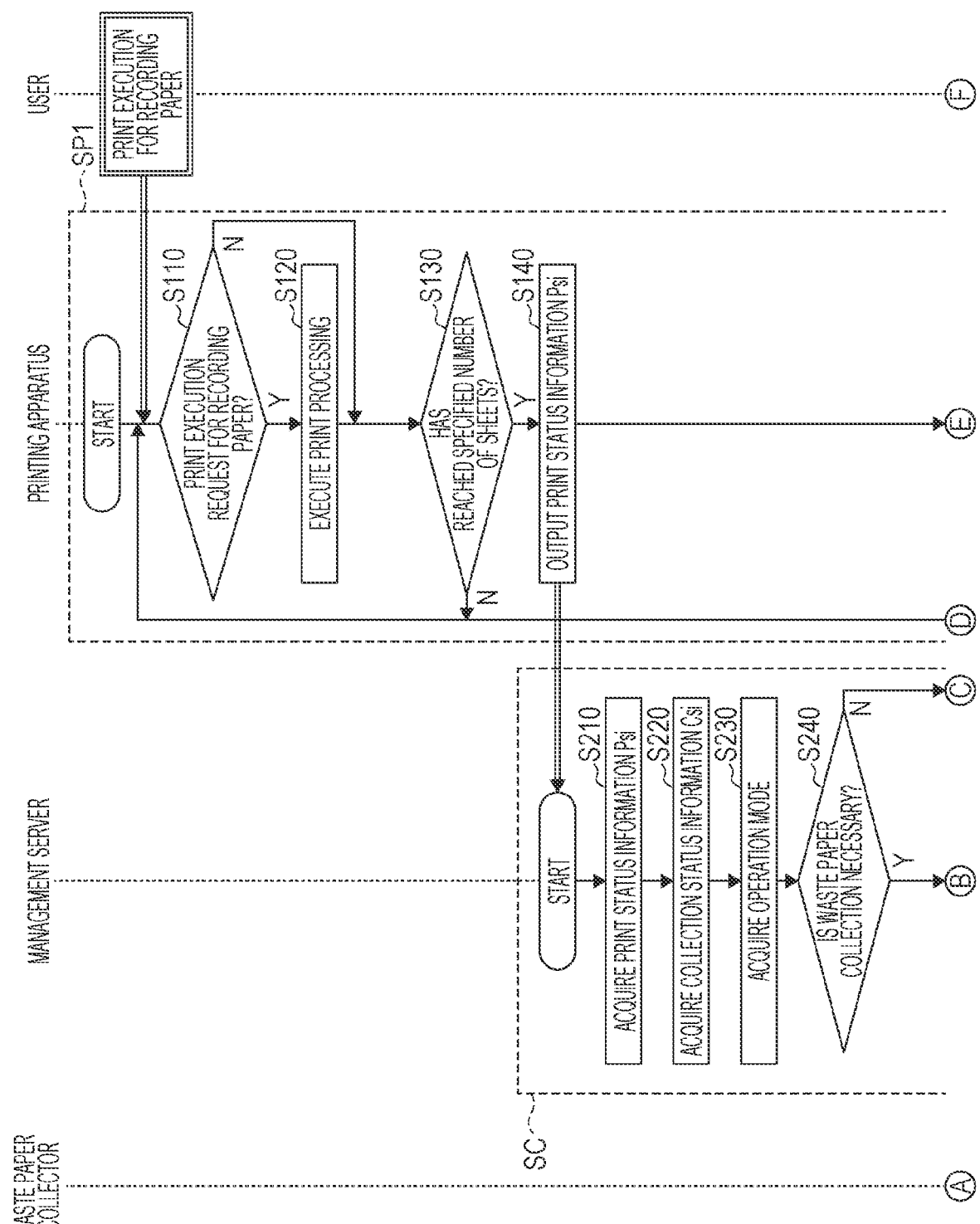
FIG. 3 is a diagram illustrating an operation example of the print management system.
Figure 3B:
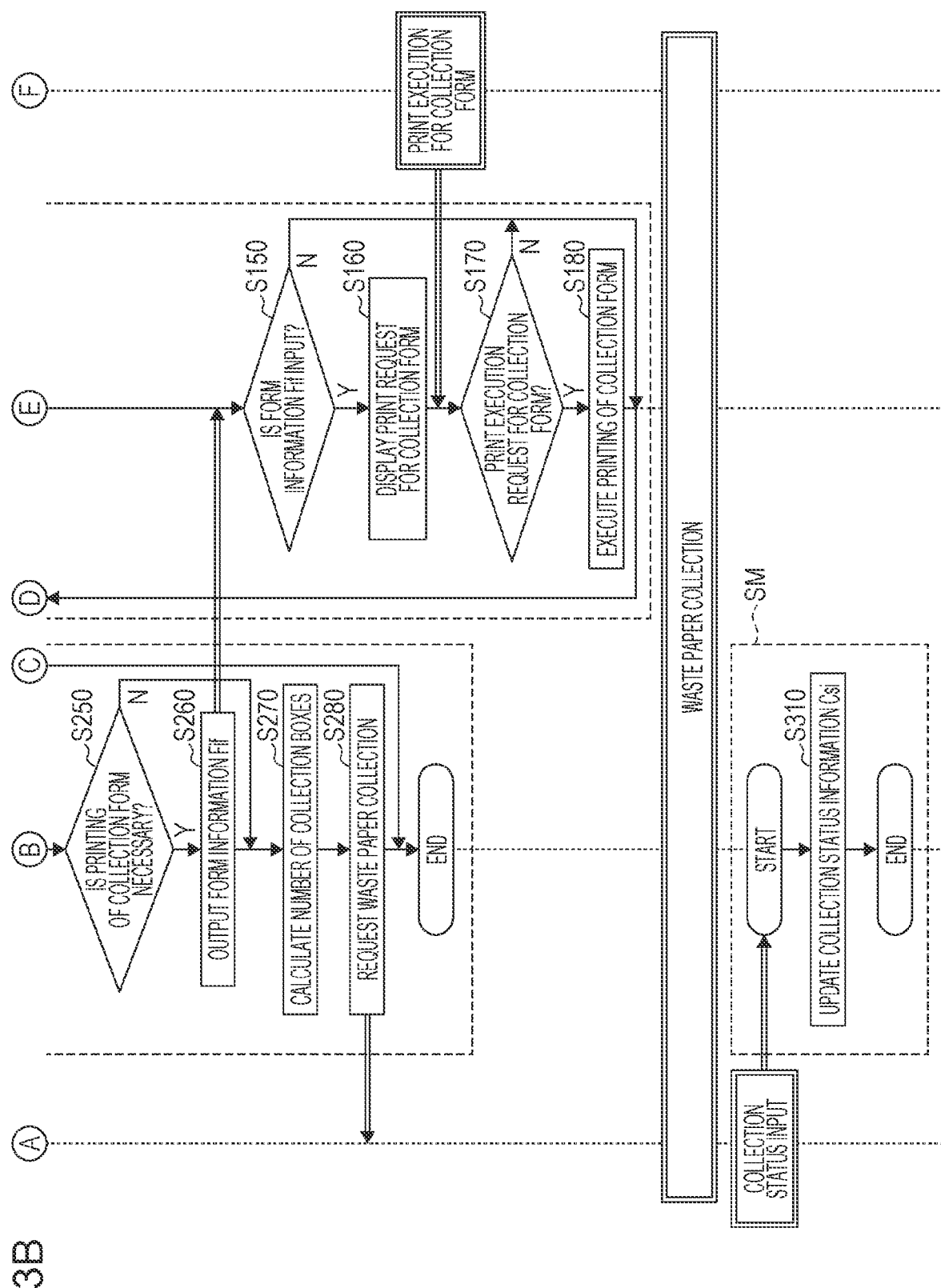

Next, a print management method, which is an example of the operation of the print management system SY, will be described. FIGS. 3 and 4 are diagrams illustrating an example of the operation of the print management system SY. The print management system SY executes, as illustrated in FIG. 3, a print sequence SP in which the printing apparatus 1 executes print processing on the recording paper, a collection sequence SC in which the management server 2 outputs the request for the waste paper collection from the user 3, and a recording sequence SM in which the collection status of the waste paper collected by the waste paper collector 4 in the collection sequence SC is stored in the management server 2, and as illustrated in FIG. 4, executes a benefit provision sequence SB for providing the benefit to the user 3.

First, the print sequence SP in which the printing apparatus 1 executes the print processing on the recording paper will be described. When the print sequence SP is executed, the print control section 100 determines whether or not the print execution request for the recording paper has been input (Step S110). Specifically, when the information to be printed on the recording paper is input to the printing apparatus 1 such as when the image data Dp is input to the printing apparatus 1 by the operation of the user 3 or when the copy target image information to be copied by the copy function is input to the printing apparatus 1 by the operation of the user 3, the print control section 100 determines that the print execution request for the recording paper has occurred.

When the print control section 100 determines that the print execution request for the recording paper has been input (Y in Step S110), the print control section 100 causes the print processing section 150 to execute the print processing based on the input information (Step S120). At this time, the print control section 100 generates the print status information PSi including information on the type and number of sheets of recording paper on which the print processing is executed, the information on the error generated when the print processing is executed, and the information as to whether or not the printed matter generated by the print processing includes the confidential information, and stores the print status information Psi in the storage section 130.

After the print processing on the recording paper by the print processing section 150 is completed, or when the print control section 100 determines that the print execution request for the recording paper has not been input to the printing apparatus 1 (N in Step S110), the print control section 100 determines whether or not the number of sheets of recording paper on which the print processing is executed has reached a specified number of sheets based on the print status information Psi stored in the storage section 130 (Step S130). When the print control section 100 determines that the number of sheets of recording paper for which the print processing has been executed has not reached the specified number of sheets (N in Step S130), the print control section 100 determines whether or not a print effective request on the recording paper has been input (Step S110).

Meanwhile, when the print control section 100 determines that the number of sheets of recording paper for which the print processing has been executed has reached the specified number of sheets (Y in Step S130), the print control section 100 reads the print status information Psi stored in the storage section 130 and outputs the print status information Psi to the print status acquisition control section 200 included in the management server 2 (Step S140). When the print status information Psi is input to the management server 2, the collection sequence SC described later is executed.

After outputting the print status information Psi to the print status acquisition control section 200, the print control section 100 determines whether or not the form information Fif is input from the management server 2 (Step S150). When the form information Fif is input to the print control section 100 (Y in Step S150), the print control section 100 causes the display section 120 to display the print request for the collection form based on the form information Fif (Step S160). Then, the print control section 100 determines whether or not the print execution request for the collection form has been input based on the display of the display section 120 (Step S170).

When the print execution request for the collection form is input from the user 3 based on the display of the display section 120, that is, when the print control section 100 determines that the print execution request for the collection form has been input (Y in Step S170), the print control section 100 executes the print processing of the collection form based on the form information Fif input to the print processing section 150 (Step S180). As a result, the collection form is provided to the user 3. Then, after the print processing of the collection form by the print processing section 150 is completed, or when the print control section 100 determines that the print execution request for the collection form has not been input (N in Step S170), the print control section 100 determines whether or not the print effective request on recording paper has been input (Step S110).

As described above, in the print sequence SP, when the print processing on the recording paper is executed based on the print execution request on the recording paper input by the user 3 and the print request for the collection form is displayed on the display section 120, the print processing of the collection form is executed based on the print execution request of the collection form input by the user 3.

Next, the collection sequence SC in which the management server 2 outputs the request for the waste paper collection from the user 3 will be described. The collection sequence SC starts by inputting the print status information Psi output by the print control section 100 to the management server 2 in Step S140 of the print sequence SP.

When the collection sequence SC starts, the print status acquisition control section 200 acquires the print status information Psi output by the print control section 100 (Step S210). In addition, the print status acquisition control section 200 acquires the collection status information Csi from the storage section 330 of the collection status acquisition section 30 (Step S220). Specifically, the print status acquisition control section 200 requests the collection status acquisition control section 300 to output the collection status information Csi. The collection status acquisition control section 300 reads the collection status information Csi stored in the storage section 330 according the request from the print status acquisition control section 200, and outputs the collection status information Csi to the print status acquisition control section 200. As a result, the print status acquisition control section 200 acquires the collection status information Csi.

In addition, the print status acquisition control section 200 acquires the operation mode of the print management system SY from the mode switching section 210 (Step S230). As a result, the print status acquisition control section 200 controls the operation of the print management system SY including the print status acquisition section 20 according to the operation mode of the print management system SY.

After that, the print status acquisition control section 200 determines whether the collection of the waste paper from the user 3 is necessary based on the print status information Psi and the collection status information Csi (Step S240). When the print status acquisition control section 200 determines that the collection of the waste paper from the user 3 is not necessary (N in Step S240), the collection sequence SC in the management server 2 ends.

Meanwhile, when the print status acquisition control section 200 determines that the collection of the waste paper from the user 3 is necessary (Y in Step S240), the print status acquisition control section 200 determines whether or not the printing of the collection form in the printing section 10 is necessary (Step S250).

Specifically, the print status acquisition control section 200 determines whether or not the printing of the collection form in the printing section 10 is necessary according to the operation mode of the print management system SY. Specifically, when the operation mode of the print management system SY is the first mode MD1, the print status acquisition control section 200 determines that the printing of the collection form in the printing section 10 is necessary, and the operation mode of the print management system SY is the second mode MD2, the print status acquisition control section 200 determines that the printing of the collection form in the printing section 10 is not necessary.

In addition, the print status acquisition control section 200 may acquire information on whether or not the printing section 10 has printed the collection form based on the form information Fif, and based on the acquired information, may determine whether or not the printing of the collection form in the printing section 10 is necessary. Specifically, when the information indicating that the collection form corresponding to the form information Fif has been printed is not input to the print status acquisition control section 200 within a predetermined period of time after the print status acquisition control section 200 outputs a signal requesting the form information output section 260 to output the form information Fif, the print status acquisition control section 200 determines that the printing of the collection form in the printing section 10 is necessary. Meanwhile, when the information indicating that the collection form corresponding to the form information Fif has been printed is input to the print status acquisition control section 200 within a predetermined period of time after the print status acquisition control section 200 outputs the signal requesting the form information output section 260 to output the form information Fif, or before a predetermined period elapses after the print status acquisition control section 200 outputs the signal requesting output of the form information Fif to the form information output section 260, the print status acquisition control section 200 determines that the printing of the collection form in the printing section 10 is not necessary.

When the print status acquisition control section 200 determines that the printing of the collection form in the printing section 10 is necessary (Y in Step S250), the print status acquisition control section 200 outputs the form information Fif to the form information output section 260 (Step S260). As a result, the print request for the collection form based on the form information Fif is displayed on the display section 120 by the control of the print control section 100 included in the printing section 10.

When the print status acquisition control section 200 determines that the printing of the collection form in the printing section 10 is not necessary (N in Step S260), or after the print status acquisition control section 200 outputs the form information Fif to the printing section 10, the print status acquisition control section 200 calculates the number of collection boxes to be sent to the user 3 based on the print status information Psi (Step S270).

Here, an example of a method of calculating the number of collection boxes in the print status acquisition control section 200 will be described. In calculating the number of collection boxes, in the following description, it is assumed that a bottom area of the collection box is A3 size and a depth of the collection box is a depth D.

In calculating the number of collection boxes, the print status acquisition control section 200 first calculates a total height H of the waste paper to be collected.

Specifically, the print status acquisition control section 200 estimates the information on the waste paper collected from the user 3 based on the information on the type and number of sheets of recording paper on which the print processing included in the print status information Psi is executed, the information on an error generated when the print processing is executed, and the information on whether or not the printed matter generated by the print processing includes the confidential information. Here, for example, the print status acquisition control section 200 estimating the information on the waste paper collected from the user 3 based on the print status information Psi includes a case where the print status acquisition control section 200 estimates the type and number of sheets of waste papers expected to be discharged from the user 3 this time as the information on the waste paper based on the information on the type and number of sheets of the recording paper printed by the user 3 after collecting the waste paper from the user 3 last time and the collection status of the waste paper collected from the user 3 in the past.

After that, the print status acquisition control section 200 classifies n thickness categories Tc1 to Tcn according to the thickness of the waste paper, based on the estimated information on the waste paper expected to be collected from the user 3. Then, the print status acquisition control section 200 acquires, in the information on the waste paper classified into the thickness categories Tc1 to Tcn, X1 which is the number of sheets of the waste paper larger than A4 and equal to or less than A3 from the information on the waste paper classified into the thickness category Tc1, Xd1 which is the number of the confidential documents included in X1, and Xj1 which is the number of sheets of the recording paper with the transport error included in X1, and acquires Y1 which is the number of sheets of the waste paper equal to or less than A4, Yd1 which is the number of the confidential documents included in Y1, and Yj1 which is the number of sheets of the recording paper with the transport error included in Y1.

After that, by substituting a thickness t1 which is a median value of the category of the thickness category Tc1, X1 which is the number of sheets of the waste paper larger than A4 and equal to or less than A3, Xd1 which is the number of the confidential documents included in X1, Xj1 which is the number of sheets of the recording paper with the transport error included in X1, and acquires Y1 which is the number of sheets of the waste paper equal to or less than A4, Yd1 which is the number of the confidential documents included in Y1, and Yj1 which is the number of sheets of the recording paper with the transport error included in Y1 into the following equation (1), the print status acquisition control section 200 calculates a height H1 of collected waste paper included in the thickness category Tc1.

$$H1 = t1 \cdot \left( ((X1 - Xd1 - Xj1) + A \cdot Xj1) + \left( \frac{(Y1 - Yd1 - Yj1) + A \cdot Yj1}{2} \right) \right) \quad (1)$$

Similarly, the print status acquisition control section 200 acquires, from the information on the waste papers classified into each of the thickness categories Tc2 to Tcn, the number of sheets of waste paper larger than A4 and equal to or less than A3, the number of confidential documents in the number of sheets larger than A4 and equal to or less than A3, the number of sheets with the transport error in the number of sheets larger than A4 and equal to or less than A3, the number of sheets of waste paper equal to or less than A4, the number of confidential documents in the number of sheets equal to or less than A4, and the number of sheets with the transport error in the number of sheets equal to or less than A4. Then, the print status acquisition control section 200 calculates heights H2 to Hn of the collected waste paper corresponding to each of the thickness categories Tc2 to Tcn, based on the same calculation formula as in the case of the thickness category Tc1. Then, the print status acquisition control section 200 calculates the total height H of the collected waste paper by calculating the sum of the calculated heights H1 to Hn.

After that, the print status acquisition control section 200 divides the calculated total height H of the waste paper by the depth D of the collection box, and rounds up the obtained value to the decimal point. The print status acquisition control section 200 holds the calculation result as the number of collection boxes to be sent to the user 3.

Here, a coefficient A included in the equation (1) is a correction coefficient for correcting the thickness of the recording paper due to the occurrence of a transport error when the print processing section 150 executes the print processing. When a transport error such as a paper jam occurs when the recording paper is transported, wrinkles are generated in the recording paper, and as a result, a space occupied by the recording paper substantially increases. The coefficient A is a correction coefficient for correcting a change in the thickness of the recording paper caused by the occurrence of such a transport error, and is set to a value of "1" or more.

As described above, after the print status acquisition control section 200 calculates the number of collection boxes to be sent to the user 3, the print status acquisition control section 200 outputs various information including the information on the calculated number of collection boxes to be sent to the user 3, the information on the operation mode of the print management system SY, and the information specifying the user 3 based on the identification information ID to the collection status acquisition control section 300 via the collection request section 250.

The collection status acquisition control section 300 generates the collection request Crq including information specifying the user 3 based on the input information on the number of collection boxes, information on the operation mode of the print management system SY, and identification information ID, and outputs the collection request Crq to the waste paper collector 4. That is, the collection status acquisition control section 300 and the print status acquisition control section 200 output the collection request Crq for collecting the waste paper from the user 3 to the waste paper collector 4 (Step S280). Then, the collection request Crq for collecting the waste paper is output from the user 3 to the waste paper collector 4, and the collection sequence SC ends.

The waste paper collector 4 collects the waste paper from the user 3 based on the collection request Crq. Specifically, when the operation mode of the print management system SY defined by the collection request Crq is the first mode MD1, the waste paper collector 4 sends the number of collection boxes specified by the collection request Crq to the user 3. The user 3 packs the waste paper in the collection box sent from the waste paper collector 4, attaches the collection form, and returns the waste paper to the waste paper collector 4. Then, the waste paper collector 4 collects the waste paper in the returned collection box. Meanwhile, when the operation mode of the print management system SY defined by the collection request Crq is the second mode MD2, the waste paper collector 4 brings a collection box of the number specified by the collection request Crq or a waste paper collection container capable of collecting a similar amount of waste paper, goes to the user 3, and collects the waste paper held by the user 3. Then, the waste paper collector 4 produces recycled paper from the collected waste paper.

After the waste paper collector 4 collects the waste paper from the user 3, the waste paper collector 4 inputs the collection status information Csi corresponding to the collected waste paper to the management server 2. As a result, in the collection sequence SC, the recording sequence SM that stores the collection status of the waste paper collected by the waste paper collector 4 in the management server 2 is executed. Specifically, in the recording sequence SM, the collection status acquisition control section 300 stores the input collection status information Csi in the storage section 330 (Step S310). At this time, the collection status acquisition control section 300 may also store information such as a date and time or place where the collection status information Csi is input. Then, the collection status acquisition control section 300 stores the collection status information Csi in the storage section 330, so that the recording sequence SM ends.

The management server 2 updates the collection status of the waste paper corresponding to the user 3 based on the collection status information Csi stored in the recording sequence SM. As a result, the management server 2 can determine whether or not the collection of the waste paper corresponding to the user 3 is necessary based on the latest collection status of the waste paper.

Next, the benefit provision sequence SB that provides the benefits to the user 3 will be described. The benefit provision sequence SB is executed when the benefit provision mode MB is ON at the timing at which the benefit is provided to the user 3. When the benefit provision sequence SB starts, the print status acquisition control section 200 reads and acquires the print status information Psi and the collection status information Csi stored in the storage section 230 (Step S410). Then, the print status acquisition control section 200 calculates the waste paper collection rate, the waste paper collection amount, and the foreign matter mixing rate of the user 3 based on the acquired print status information Psi and collection status information Csi, and determines whether or not it is necessary to provide benefits to the user 3 based on the calculation result (Step S420). Here, the print status acquisition control section 200 may determine whether or not it is necessary to provide benefits to the user 3 based on any one of the waste paper collection rate, the waste paper collection amount, and the foreign matter mixing rate of the user 3, or may determine that whether or not it is necessary to provide benefits to the user 3 by comprehensively considering two or more of the waste paper collection rate, the waste paper collection amount, and the foreign matter mixing rate of the user 3. Furthermore, the print status acquisition control section 200 may determine whether or not the benefit provision is necessary based on the other information.

When the print status acquisition control section 200 determines that it is not necessary to provide the benefit to the user 3 (N in Step S420), the benefit provision sequence SB in the management server 2 ends. Meanwhile, when the print status acquisition control section 200 determines that it is necessary to provide the benefit to the user 3 (Y in Step S420), the print status acquisition control section 200 instructs the benefit provision instruction section 270 to perform the benefit provision processing. As a result, the benefit provision instruction section 270 outputs the benefit provision information Bgi including the information of the benefit to be provided to the user 3 (Step S430) and provides the benefit, and the benefit provision sequence SB in the management server 2 ends.

When the benefit provision information Bgi output by the benefit provision instruction section 270 is input to the printing section 10, the benefit provision sequence SB in the printing section 10 starts. The benefit provision information Bgi output by the benefit provision instruction section 270 is input to the print control section 100. The print control section 100 generates the benefit information Bif indicating information on the benefit to be provided to the user 3 based on the information on the benefit to be provided and included in the benefit provision information Bgi to be input. Then, the print control section 100 displays the information based on the benefit information Bif on the display section 120 (Step S440).

Here, the benefit provision performed by the benefit provision instruction section 270 may be a benefit that is directly monetary beneficial to the user 3, may be a benefit that does not directly benefit the user 3 in monetary terms, but result in non-monetary benefits, or may be both. For example, the benefit provision instruction section 270 instructs a coupon ticket issuing system to issue a coupon ticket as a benefit provision to the user 3. The benefit provision instruction section 270 instructs the cost billing system to discount the cost of the user 3 as the benefit provision. The benefit provision instruction section 270 instructs the waste paper collector 4 to send an article such as tissue paper together when sending the collection box. The user 3 is commended. A certificate certifying that the waste paper is properly processed is issued to the user 3. However, it is not limited to this. Then, the benefit may be provided every time the discharged paper is collected, or may be collectively provided at regular intervals such as every month or every year.

Here, the print status acquisition section 20 is an example of a first acquisition section, the collection status acquisition section 30 is an example of a second acquisition section, the benefit provision instruction section 270 is an example of a provision instruction section, the print status acquisition control section 200 is an example of a determination section, the form information output section 260 is an example of a print request section, and the display section 120 is an example of a notification section. Further, the print status information Psi is an example of print information, and the collection status information Csi is an example of collection information. The print sequence SP in which the printing section 10 performs printing on the recording paper is an example of a printing step, Step S210 in which the print status acquisition section 20 acquires the print status information Psi indicating the print status in the printing section 10 is an example of a first acquisition step, the recording sequence SM in which the collection status acquisition section 30 acquires the collection status information Csi indicating the collection status of the waste paper is an example of the second acquisition step, the benefit provision sequence SB in which the benefit provision instruction section 270 gives an instruction to provide a benefit to the user 3 of the printing apparatus 1 based on at least one of the print status information Psi and the collection status information Csi is an example of a benefit provision step, the waste paper collection executed by outputting (Step S280) the collection request Crq for collecting the waste paper from the user 3 to the waste paper collector 4 by the collection status acquisition control section 300 and the print status acquisition control section 200 is an example of a collection step, and the production of recycled paper based on the waste paper by the waste paper collector 4 after the collection step is an example of a production step.

1.4 Action Effects

As described above, the print management system SY of the first embodiment includes the printing section 10 that performs printing on the recording paper, the storage sections 130, 230, and 330 that store the print status information Psi indicating the print status in the printing section 10, the print status acquisition control section 200 that determines whether or not the waste paper collection is necessary based on the print status information Psi, the form information output section 260 that outputs the print request of the collection form to the printing section 10 based on the determination result of the print status acquisition control section 200, and the collection request section 250 that requests the collection of the waste paper using the collection form based on the determination result of the print status acquisition control section 200.

In such a print management system SY of the first embodiment, the print status acquisition control section 200 can determine whether or not the collection of the waste paper is necessary according to the print statuses of the printing apparatus 1 and the printing section 10. Then, when the print status acquisition control section 200 determines that it is preferable to collect the waste paper from the user 3, the form information output section 260 outputs the form information Fif to the printing section 10, and the printing section 10 prints the collection form corresponding to the input form information Fif. That is, thereby, it is possible to promote the user 3 who uses the printing apparatus 1 to collect the waste paper at a timing suitable for collecting the waste paper, and to provide the collection form used for collecting the waste paper. Therefore, the labor required for the user 3 to collect the waste paper can be reduced. Accordingly, a recycling rate of waste paper is improved, and as a result, effective utilization of resources and further promotion of environmental protection are possible.

Further, when the print status acquisition control section 200 determines that it is preferable to collect the waste paper from the user 3, the collection request section 250 outputs the collection request Crq requesting the collection of the waste paper to the waste paper collector 4 who collects the waste paper. As a result, the waste paper collector 4 sends the collection box for collecting waste paper from the user 3 to the user 3 and provides the waste paper to the user 3. That is, in the print management system SY of the first embodiment, it is not necessary for the waste paper collector 4 to individually manage the status of the user 3, and the waste paper collector 4 is notified of the timing suitable for collecting the waste paper from the user 3. As a result, the waste paper collector 4 can promote the user 3 who uses the printing apparatus 1 to collect the waste paper at a timing suitable for collecting the waste paper, and provide a collection box used for collecting the waste paper. Accordingly, the labor required for the waste paper collector 4 to manage the waste paper collection can be reduced, and the labor required for the user 3 to collect the waste paper can be further reduced. As a result, the waste paper collection rate from the user 3 is further improved, and effective utilization of resources and further promotion of environmental protection are possible.

In addition, the print management system SY of the first embodiment includes the printing apparatus 1 including the printing section 10 that performs printing on the recording paper, the print status acquisition section 20 that acquires the print status information Psi indicating the print status of the printing section 10, the collection status acquisition section 30 that acquires the collection status information Csi indicating the collection status of waste paper, and the benefit provision instruction section 270 that gives an instruction to provide a benefit to the user 3 of the printing apparatus 1 based on at least one of the print status information Psi and the collection status information Csi.

In such a print management system SY, the benefit provision instruction section 270 can provide the benefit to the user 3 according to the collection status of the waste paper from the user 3 based on the print status of the printing section 10 in the user 3 and the collection status of the waste paper from the user 3. Accordingly, it is possible to raise the awareness of the user 3 regarding the collection of the waste paper. As a result, the amount of waste paper collected from the user 3 and the waste paper collection rate are further improved. As a result, effective utilization of resources and further promotion of environmental protection will be possible.

Then, since the waste paper collection rate from the user 3 increases, the waste paper collector 4 can continuously collect the waste paper with a small amount of labor. As a result, production efficiency of recycled paper based on the waste paper collected by the waste paper collector 4 is improved. That is, in the print management system SY of the first embodiment, the waste paper collection rate and the production efficiency of recycled paper are improved, and it is possible to further promote the effective utilization of resources.

1.5 Modification Example

In the print management system SY of the first embodiment described above, it is assumed that all the configurations included in the print status acquisition section 20 and the configurations included in the collection status acquisition section 30 are provided in the management server 2. However, some or all of the configurations included in the print status acquisition section 20 and the configurations included in the collection status acquisition section 30 may be provided in the printing apparatus 1. Further, any one of the configurations included in the printing section 10, the configurations included in the print status acquisition section 20, and the configurations included in the collection status acquisition section 30 may be configured by one semiconductor device.

Further, in the print management system SY of the first embodiment described above, the identification information ID stored in the printing apparatus 1 may be input by the user by operating the printing apparatus 1, and may be uniquely given to the printing apparatus 1. By associating the printing apparatus 1 with the name, address, contact information, or the like of the user 3 of the printing apparatus 1 as the identification information ID in advance, the management server 2 can acquire the identification information ID from the printing apparatus 1 to print the collection form.

In addition, each configuration of the print management system SY of the first embodiment described above may be configured as one by coordinating a plurality of devices, and some of the above-described configurations may be included in different devices.

Further, in the print management system SY of the first embodiment described above, the waste paper collector 4 may be configured to include one or a plurality of individuals or corporations that collect the waste paper from the user 3, and one or a plurality of individuals or corporations that produce recycled paper from collected waste paper.

In addition, the calculation method and the calculation formula in the first embodiment described above are merely examples, and the present disclosure is not limited thereto.

In addition, a part or all of various processing executed by the print management system SY of the first embodiment described above may be executed by Artificial Intelligence (AI). For example, the AI may execute a determination of the timing of collecting the waste paper, the determination of whether or not to provide the benefit, the determination of an amount of the benefit to be provided, and the like.

In addition, either the benefit provision associated with the input of the collection status information Csi by the waste paper collector 4 or the production of recycled paper by the waste paper collector 4 may be performed first.

2. SECOND EMBODIMENT

A print management system SY of a second embodiment will be described. In describing the print management system SY of the second embodiment, the same reference numerals are given to the same configurations as the print management system SY of the first embodiment, and the description thereof will be simplified or omitted.

Figure 5A:
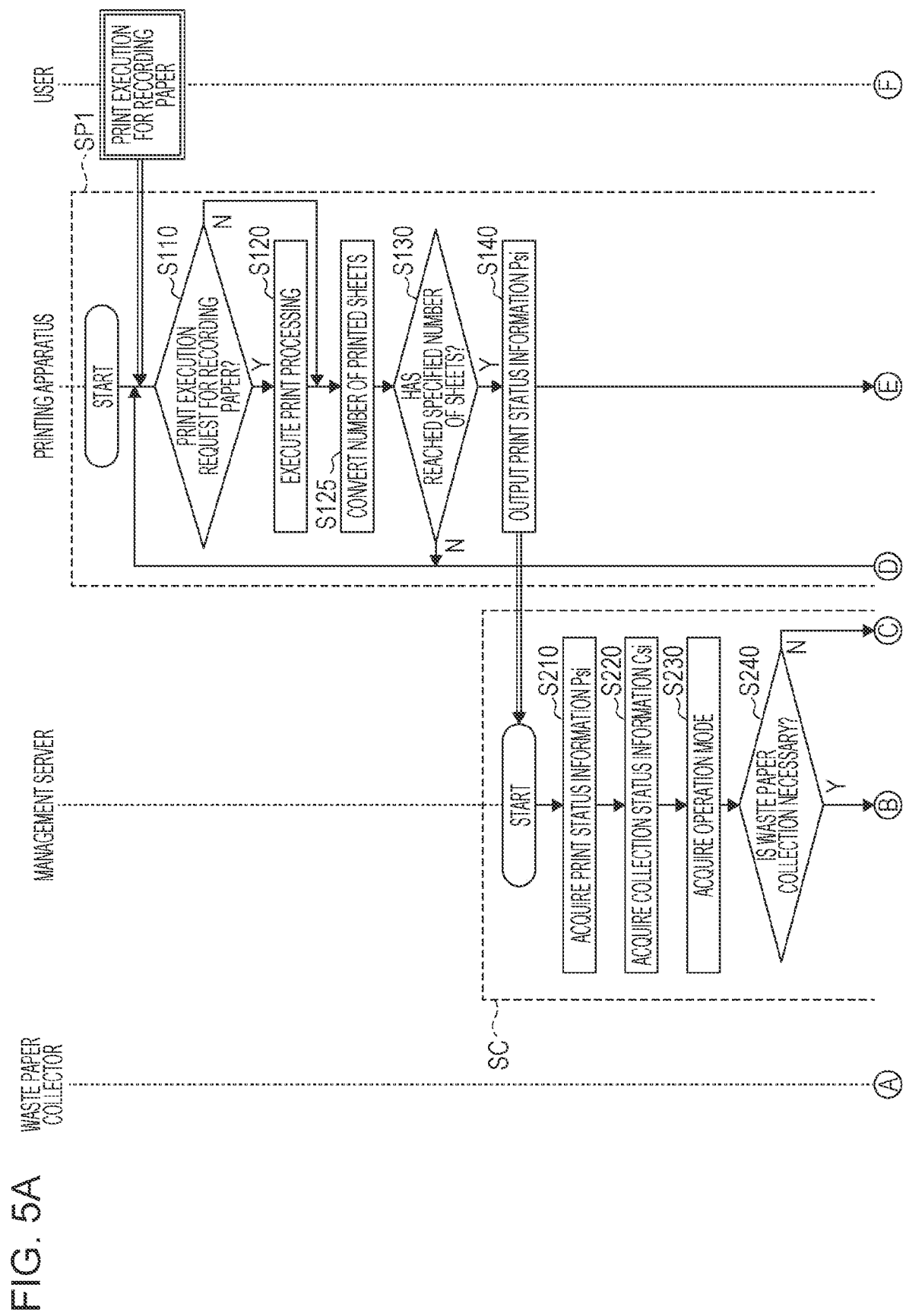
FIG. 5 is a diagram illustrating an operation example of a print management system of a second embodiment.
Figure 5B:
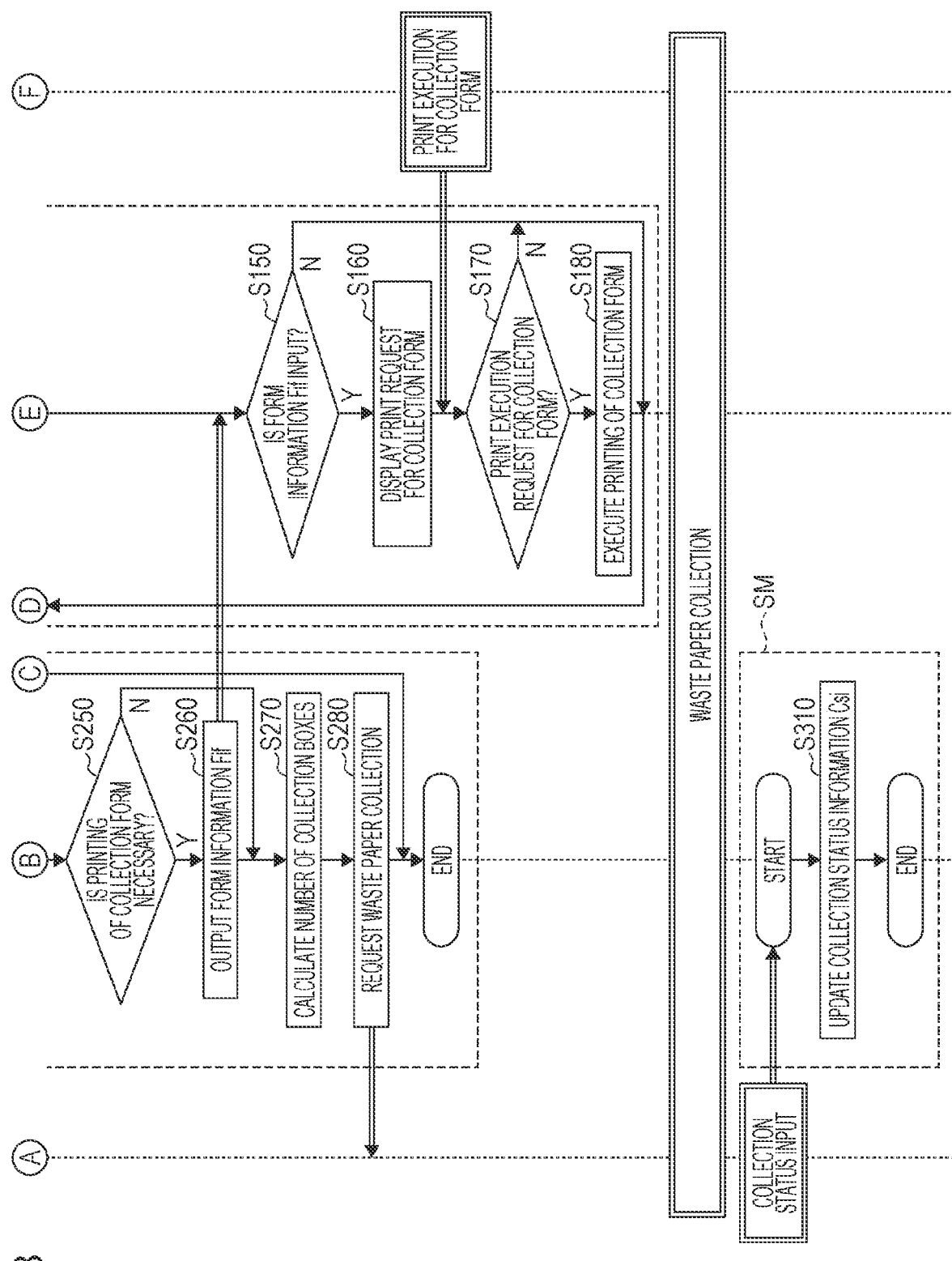

FIG. 5 is a diagram illustrating an operation example of the print management system SY of the second embodiment. As illustrated in FIG. 5, in the print management system SY of the second embodiment, when the print sequence SP is executed, the print control section 100 determines whether or not a print execution request for the recording paper is input (Step S110). Then, when the print control section 100 determines that the print execution request for the recording paper has been input (Y in Step S110), the print control section 100 causes the print processing section 150 to execute the print processing based on the input information (Step S120). At this time, the print control section 100 generates the print status information PSi including information on the type and number of sheets of recording paper on which the print processing is executed, the information on the error generated when the print processing is executed, and the information as to whether or not the printed matter generated by the print processing includes the confidential information, and stores the print status information Psi in the storage section 130.

Then, after the print processing by the print processing section 150 is completed, or when the print control section 100 determines that the print execution request for the recording paper has not been input to the printing apparatus 1 (N in Step S110), the print control section 100 converts the number of sheets of recording paper on which the print processing is executed into the number of sheets of a predetermined size based on the print status information Psi stored in the storage section 130. That is, the print control section 100 converts the number of printed sheets (Step S125).

A specific example of conversion of the number of printed sheets executed by the print control section 100 will be described. In order to explain an example of conversion of the number of printed sheets, in the following description, a case of converting the number of printed sheets to A3 size will be illustrated.

In executing the conversion of the number of printed sheets, the print control section 100 acquires, from the print status information Psi, x which is the number of sheets of the recording paper larger than A4 and equal to or less than A3, xd which is the number of the confidential documents included in x, and xj which is the number of sheets of the recording paper with the transport error included in x, and acquires y which is the number of sheets of the recording paper equal to or less than A4, yd which is the number of the confidential documents included in y, and yj which is the number of sheets of the recording paper with the transport error included in y.

After that, by substituting x which is the number of sheets of the recording paper larger than A4 and equal to or less than A3, xd which is the number of the confidential documents included in x, xj which is the number of sheets of the recording paper with the transport error included in x, y which is the number of sheets of the recording paper equal to or less than A4, yd which is the number of the confidential documents included in y, and yj which is the number of sheets of the recording paper with the transport error included in y into the following equation (2), the print control section 100 calculates a converted number of sheets CON obtained by converting the number of printed sheets.

$$CON = ((x - xd - xj) + B \cdot xj) + \left(\frac{(y - yd - yj) + B \cdot yj}{2}\right) \quad (2)$$

Here, a coefficient B included in the equation (2) is a correction coefficient for correcting the thickness of the recording paper due to the occurrence of the transport error when the print processing section 150 executes the print processing. When a transport error such as a paper jam occurs when the recording paper is transported, wrinkles are generated in the recording paper, and as a result, a space occupied by the recording paper substantially increases. The coefficient B is a correction coefficient for correcting a change in the thickness of the recording paper caused by the occurrence of such a transport error, and is set to a value of "1" or more.

After the print control section 100 converts the number of printed sheets, the print control section 100 determines whether or not the converted number of sheets CON has reached the specified number of sheets (Step S130). Then, when the print control section 100 determines that the converted number of sheets CON has not reached the specified number of sheets (N in Step S130), the print control section 100 determines whether or not a print effective request is input to the printing apparatus 1 (Step S110).

Meanwhile, when the print control section 100 determines that the number of sheets of recording paper for which the print processing has been executed has reached the specified number of sheets (Y in Step S130), the print control section 100 reads the print status information Psi stored in the storage section 130 and outputs the print status information Psi to the print status acquisition control section 200 included in the management server 2 (Step S140).

After that, the print management system SY executes the operations after Step S140 in the print sequence SP, and executes the operations in each of the collection sequence SC, the recording sequence SM, and the benefit provision sequence SB, as in the case of the first embodiment.

Even the print management system SY of the second embodiment configured as described above has the same action effects as the print management system SY of the first embodiment. Further, in the print management system SY of the second embodiment, by converting the number of printed sheets and calculating the converted number of sheets CON using the equation (2), even when the transport error occurs when the print processing is executed on the recording paper and the thickness of the waste paper is large, the collection timing at which the user 3 requests the collection of the waste paper can be grasped in more detail.

Specifically, the print status information Psi includes information indicating the presence or absence of the transport error of the recording paper, and the timing at which the print control section 100 determines that the specified number of sheets has been reached is faster when the print status information Psi includes information indicating that the transport error has occurred than when the print status information Psi does not include the information indicating that the transport error has occurred. Therefore, the print status information Psi includes information indicating the presence or absence of the transport error of the recording paper, and the timing at which the print status acquisition control section 200 determines that the waste paper collection is necessary is faster when the print status information Psi includes the information indicating that the transport error has occurred than when the print status information Psi includes the information indicating that the transport error has not occurred.

As a result, the timing at which the user 3 requests the collection of the waste paper can be grasped in more detail, and the user 3 can be promoted to collect the waste paper at a more optimal timing.

3. THIRD EMBODIMENT

Next, a print management system SY of a third embodiment will be described. In describing the print management system SY of the third embodiment, the same reference numerals are given to the same configurations as the print management system SY of the first embodiment and the second embodiment, and the description thereof will be simplified or omitted.

Figure 6:
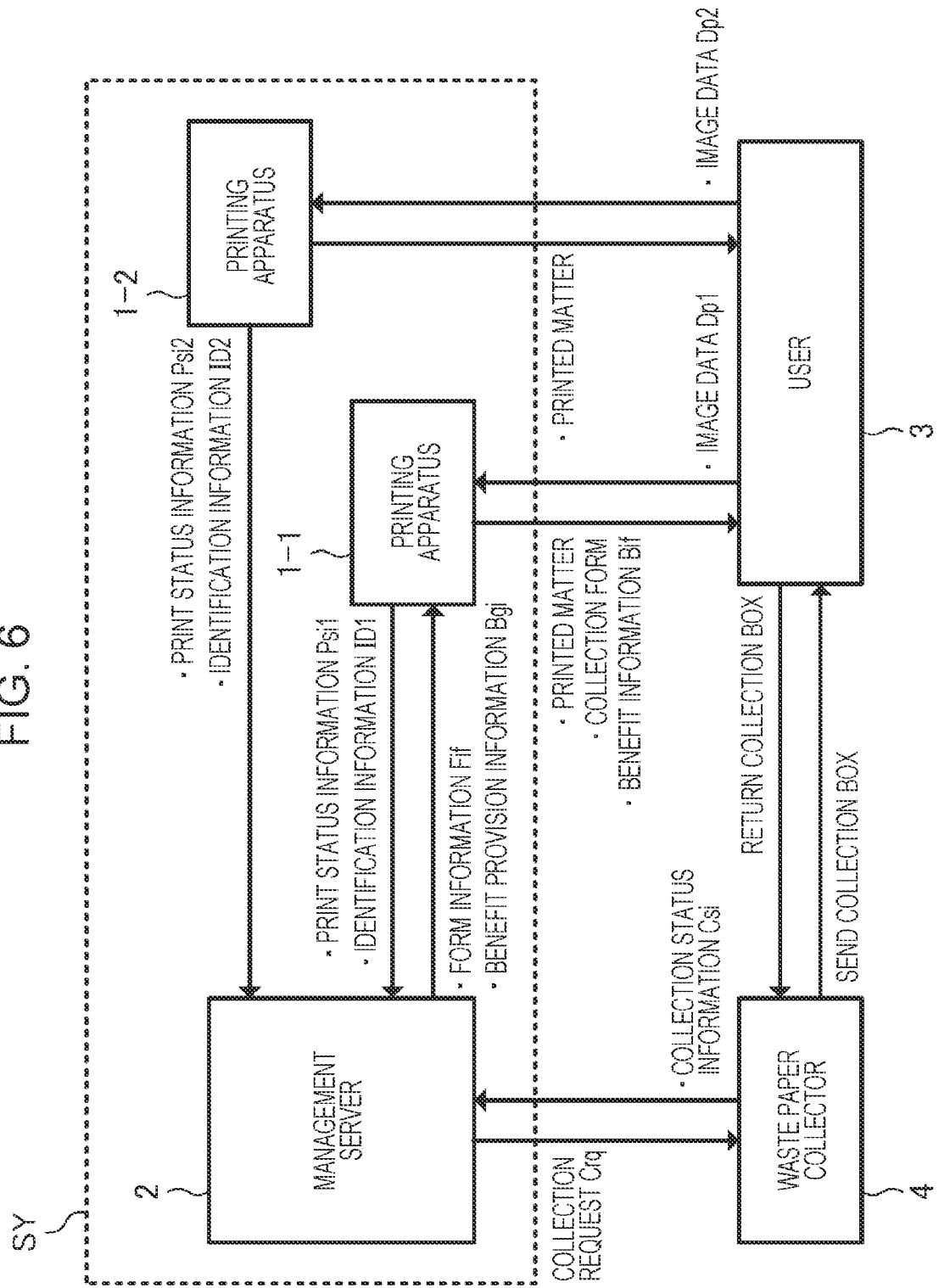
FIG. 6 is a diagram illustrating an outline of waste paper collection using a print management system of a third embodiment.

FIG. 6 is a diagram illustrating an outline of waste paper collection using the print management system SY of the third embodiment. As illustrated in FIG. 6, the print management system SY of the third embodiment differs from the print management systems SY of the first embodiment and the second embodiment in that the user 3 operates two printing apparatuses 1. That is, the print management system SY of the third embodiment is different from the print management system SY of the first embodiment and the second embodiment in that the two printing apparatuses 1 used by the user 3 are communicably connected to one management server 2.

Here, in the following description, one of the printing apparatuses 1 operated by the user 3 is referred to as a printing apparatus 1-1, and the other of the printing apparatuses 1 operated by the user 3 is referred to as a printing apparatus 1-2. Further, the printing apparatus 1-1 and the printing apparatus 1-2 have the same configurations, and both have the same configurations as the printing apparatus 1 illustrated in FIG. 2. That is, each of the printing apparatuses 1-1 and 1-2 includes the print control section 100, the input section 110, the display section 120, the storage section 130, and the print processing section 150. In the following description, the print control section 100, the input section 110, the display section 120, the storage section 130, and the print processing section 150 included in the printing apparatus 1-1 may be referred to as a print control section 100-1, an input section 110-1, a display section 120-1, a storage section 130-1, and a print processing section 150-1, and the print control section 100, the input section 110, the display section 120, the storage section 130, and the print processing section 150 included in the printing apparatus 1-2 may be referred to as a print control section 100-2, an input section 110-2, a display section 120-2, a storage section 130-2, and a print processing section 150-2.

Further, the printing apparatus 1-1 is communicably connected to the management server 2. The identification information ID and the image data Dp1 are input to the printing apparatus 1-1. The identification information ID is information for specifying the user 3, and the image data Dp1 is information for characters or images formed on the recording paper by the printing apparatus 1-1. As a result, the print processing section 150 included in the printing apparatus 1-1 executes print processing of printing a character or an image corresponding to the information included in the input image data Dp1 on the recording paper. At this time, the print control section 100-1 included in the printing apparatus 1-1 generates the print status information Psi1 indicating the execution status of the print processing executed by the print processing section 150-1, and stores the print status information Psi1 in the storage section 130-1. Then, when the number of sheets of recording paper for which the print processing section 150-1 has executed the print processing exceeds a predetermined specified number of sheets, the print control section 100-1 outputs the print status information Psi1 stored in the storage section 130-1 to the management server 2.

Further, the printing apparatus 1-2 is communicably connected to the management server 2. The identification information ID and the image data Dp2 are input to the printing apparatus 1-2. The identification information ID is information for specifying the user 3, and the image data Dp2 is information for characters or images formed on the recording paper by the printing apparatus 1-2. As a result, the print processing section 150 included in the printing apparatus 1-2 executes print processing of printing a character or an image corresponding to the information included in the input image data Dp2 on the recording paper. At this time, the print control section 100-2 included in the printing apparatus 1-2 generates the print status information Psi2 indicating the execution status of the print processing executed by the print processing section 150-2, and stores the print status information Psi2 in the storage section 130-2. Then, when the number of sheets of recording paper for which the print processing section 150-2 has executed the print processing exceeds a predetermined specified number of sheets, the print control section 100-2 outputs the print status information Psi2 stored in the storage section 130-2 to the management server 2.

The print status acquisition control section 200 included in the print status acquisition section 20 of the management server 2 determines whether or not the waste paper collection for the user 3 is necessary based on the print status information Psi1 output by the printing apparatus 1-1, the print status information Psi2 output by the printing apparatus 1-2, and the collection status information Csi input by the waste paper collector 4. When it is determined that the waste paper collection for the user 3 is necessary, the management server 2 outputs the form information Fif to the printing apparatus 1-1 according to the operation mode of the print management system SY, and outputs the collection request Crq requesting the collection of waste paper to the waste paper collector 4.

Further, the management server 2 generates the benefit provision information Bgi for granting the benefit to the user 3 based on the print status information Psi1 input from the printing apparatus 1-1, the print status information Psi2 input from the printing apparatus 1-2, and the collection status information Csi input by the waste paper collector 4, and outputs the benefit provision information Bgi to the printing apparatus 1-1.

As described above, in the print management system SY of the third embodiment, the two printing apparatuses 1-1 and 1-2 that accept the operation by the user 3 are communicably connected to the management server 2. Even the print management system SY of the third embodiment has the same action effects as the print management systems SY of the first embodiment and the second embodiment.

Although embodiments and modification examples have been described above, the present disclosure is not limited to these embodiments, and can be implemented in various embodiments without departing from the gist thereof. For example, it is also possible to appropriately combine the above embodiments.

The present disclosure includes substantially the same configurations (for example, configurations having the same functions, methods, and results, or configurations having the same object and effect) as those described in the embodiments. Further, the present disclosure includes a configuration in which a non-essential part of the configuration described in the embodiment is replaced. In addition, the present disclosure includes a configuration that achieves the same action effects as the configuration described in the embodiment or a configuration that can achieve the same object. Further, the present disclosure includes a configuration in which a known technique is added to the configuration described in the embodiment. According to the present disclosure, one configuration described in the embodiments may be realized by a plurality of devices in cooperation with each other, or the plurality of configurations described in the embodiments may be realized by one device. Further, the present disclosure may be regarded as a disclosure of the print management system, may be regarded as a disclosure of a program for controlling a print management system, or may be regarded as a print management method or a method of collecting waste paper to produce recycled paper.

The following contents are derived from the above-described embodiments.

According to one aspect of the present disclosure, there is provided a print management system including:

a printing apparatus including a printing section that performs printing on recording paper;

a first acquisition section that acquires print information indicating a print status of the printing section;

a second acquisition section that acquires collection information indicating a collection status of waste paper; and a provision instruction section that gives an instruction to provide a benefit to a user of the printing apparatus based on both the print information and the collection information.

According to this print management system, the benefit is provided to the user of the printing apparatus based on the print information indicating the print status of the printing section and the collection information indicating the collection status of the waste paper, and thus, it is possible to raise the awareness of the user regarding the collection of the waste paper. As a result, the amount of waste paper collected from the user and the waste paper collection rate are further improved. As a result, effective utilization of resources and further promotion of environmental protection will be possible.

In one aspect of the print management system, the first acquisition section may include a determination section that determines whether or not waste paper collection is necessary based on a waste paper collection rate calculated based on the print information and the collection information and the print information, and a collection request section that requests the waste paper collection based on a determination result of the determination section.

According to this print management system, the determination section determines whether or not the collection of the waste paper is necessary based on the print status of the printing section, and when the determination section determines that it is necessary to collect the waste paper, the waste paper collector who collects the waste paper is requested to collect the waste paper, and thus, the waste paper collector does not need to manage the collection timing of the waste paper from the user, and the convenience of the waste paper collector is improved. Furthermore, since the waste paper collector can grasp an optimum collection timing, by providing the user with materials required for collecting the waste paper, it is possible to provide the materials to the user at the optimum collection timing, and as a result, it is also possible to promote the user to collect the waste paper. According to the print management system as described above, the convenience for the user is high, and the labor required for the waste paper collection is reduced. Therefore, a waste paper collection rate from users is improved, and it is possible to effectively utilize resources and further promote environmental protection.

In one aspect of the print management system, the collection request section may request the waste paper collection with identification information for specifying a user of the printing apparatus, the second acquisition section may acquire the collection information with the identification information, and the provision instruction section may give an instruction to provide a benefit to the user specified by the identification information.

In one aspect of the print management system, the first acquisition section may include a determination section that determines whether or not waste paper collection is necessary based on a waste paper collection rate calculated based on the print information and the collection information and the print information, a print request section that outputs a print request for a collection form to the printing section based on a determination result of the determination section, and a collection request section that requests the waste paper collection using the collection form based on the determination result of the determination section.

According to this print management system, the determination section determines whether or not the collection of the waste paper is necessary based on the print status of the printing section. Therefore, the user does not need to manage the timing of collecting the waste paper and the convenience of the user is improved. Further, when the determination section determines that it is necessary to collect the waste paper, the collection form used for collecting the waste paper is provided to the user, so that the labor of the user is reduced. In addition, when the determination section determines that it is necessary to collect the waste paper, the waste paper collector who collects the waste paper is requested to collect the waste paper. Accordingly, the waste paper collector does not need to manage the collection timing of the waste paper from the user, and the convenience of the waste paper collector is improved. Furthermore, since the waste paper collector can grasp an optimum collection timing, by providing the user with materials required for collecting the waste paper, it is possible to provide the materials to the user at the optimum collection timing, and as a result, it is also possible to promote the user to collect the waste paper. That is, it is possible to provide a print management system that is highly convenient for the user and further reduces the labor required for collecting the waste paper. Therefore, a waste paper collection rate from users is improved, and it is possible to effectively utilize resources and further promote environmental protection.

In one aspect of the print management system,
the collection form may include identification information for specifying a user of the printing apparatus,
the second acquisition section may acquire the collection information with the identification information, and
the provision instruction section may give an instruction to provide a benefit to the user specified by the identification information.

In one aspect of the print management system,
a notification section that notifies the user of the benefit provision may be further provided.

In one aspect of the print management system,
the second acquisition section may acquire a foreign matter mixing rate mixed in the waste paper as the collection information, and
the provision instruction section may give an instruction to provide a benefit based on the foreign matter mixing rate.

According to this print management system, a possibility that foreign matter is mixed in the waste paper is reduced, and efficiency of reusing the collected waste paper is improved. Therefore, it is possible to further promote effective utilization of resources.

According to another aspect of the present disclosure, there is provided a print management method including:
a first acquisition step of acquiring print information indicating a print status in a printing section;
a collection step of performing collection of waste paper;
a second acquisition step of acquiring collection information indicating a collection status of the waste paper;
a production step of producing recycled paper from the collected waste paper.
a benefit provision step of providing a benefit based on the print information and the collection information.

According to this print management method, in the first acquisition step, print information indicating the print status of the printing section is acquired, and in the second acquisition step, collection information indicating the collection status of the waste paper is acquired. Then, in the benefit provision step, the benefit is provided to the user of the printing apparatus based on the print information and the collection information. Therefore, it is possible to raise the awareness of the user regarding the waste paper collection. As a result, the amount of waste paper collected from the user and the waste paper collection rate are further improved. As a result, effective utilization of resources and further promotion of environmental protection will be possible.

What is claimed is:

1. A recycled paper production method comprising:
acquiring print information indicating a print status;
causing a printing apparatus to output a collection form that includes identification information for specifying a user of the printing apparatus and collecting of waste paper by using the collection form;
acquiring collection information indicating a collection status of the waste paper and the identification information included by the collection form collected together with the waste paper;
providing a benefit to the user specified by the identification information based on the print information and the collection information; and
producing recycled paper from the collected waste paper.

2. The recycled paper production method according to claim 1, further comprising a notifying a user of the benefit provision.

3. The recycled paper production method according to claim 1, wherein
information on a foreign matter mixed in the waste paper is acquired as the collection information, and
the benefit is provided based on the print information, the collection information, and the information on the foreign matter.

4. The recycled paper production method according to claim 1, wherein
the collection of the waste paper includes removing the waste paper from a user site in which the printing apparatus is located, and
the collection information indicates the collection status of the waste paper that has been removed from the user site.

5. The recycled paper production method according to claim 4, wherein
the collection of the waste paper is performed according to a determination that the collection of the waste paper is performed based on a waste paper collection rate calculated based on the print information and the collection information and the print information.

6. The recycled paper production method according to claim 5, wherein
the waste paper collection is requested with the identification information, and
the collection information is acquired with the identification information.

7. The recycled paper production method according to claim 4, further comprising
determining that the collection of the waste paper is performed based on a waste paper collection rate calculated based on the print information and the collection information and the print information.

8. A print management system comprising:
a printing apparatus including a printing section that performs printing on recording paper; and
a processor that
acquires print information indicating a print status of the printing section,
causes the printing apparatus to output a collection form that includes identification information for specifying a user of the printing apparatus,
acquires collection information indicating a collection status of waste paper and the identification information included by the collection form collected together with the waste paper, and gives an instruction to provide a benefit to the user specified by the identification information based on both the print information and the collection information.

9. A non-transitory computer-readable storage medium storing a program, the program causing a computer to execute functions comprising:

communicating with a printing apparatus to acquire print information indicating a print status of the printing apparatus;

causing the printing apparatus to output a collection form that includes identification information for specifying a user of the printing apparatus;

acquiring collection information indicating a collection status of waste paper and the identification information included by the collection form collected together with the waste paper; and giving an instruction to provide a benefit to the user specified by the identification information based on both the print information and the collection information.

\* \* \* \* \*